US007941496B2

United States Patent
Gross et al.

(10) Patent No.: US 7,941,496 B2
(45) Date of Patent: May 10, 2011

(54) SYSTEM, METHOD AND COMPUTER PROGRAM FOR RECIPIENT CONTROLLED COMMUNICATIONS

(76) Inventors: Daniel Gross, Toronto (CA); Erwin Gross, London (GB)

( * ) Notice: Subject to any disclaimer, the term of this patent is extended or adjusted under 35 U.S.C. 154(b) by 0 days.

(21) Appl. No.: 12/781,734

(22) Filed: May 17, 2010

(65) Prior Publication Data

US 2010/0287237 A1    Nov. 11, 2010

Related U.S. Application Data

(63) Continuation of application No. 10/475,138, filed as application No. PCT/CA02/00561 on Apr. 22, 2002, now Pat. No. 7,765,262.

(30) Foreign Application Priority Data

Apr. 20, 2001  (GB) ................................. 0109808.6

(51) Int. Cl.
*G06F 15/16* (2006.01)
*G01N 23/201* (2006.01)
(52) U.S. Cl. ..................... 709/206; 709/204; 379/88.13
(58) Field of Classification Search .......... 709/201–208, 709/211, 217–219, 227–231, 245–246, 248; 379/88.13–88.14, 88.17, 93.24
See application file for complete search history.

(56) References Cited

U.S. PATENT DOCUMENTS

| | | | | |
|---|---|---|---|---|
| 5,329,578 | A | | 7/1994 | Brennan et al. |
| 5,633,916 | A | * | 5/1997 | Goldhagen et al. ........ 379/88.17 |
| 5,786,770 | A | * | 7/1998 | Thompson ............... 340/825.02 |
| 5,987,100 | A | * | 11/1999 | Fortman et al. ............ 379/88.14 |
| 5,999,967 | A | * | 12/1999 | Sundsted ...................... 709/206 |
| 6,003,070 | A | * | 12/1999 | Frantz ............................ 709/206 |
| 6,134,235 | A | * | 10/2000 | Goldman et al. ............ 370/352 |
| 6,157,954 | A | * | 12/2000 | Moon et al. ................... 709/228 |
| 6,560,638 | B1 | * | 5/2003 | Haneda et al. ................ 709/206 |
| 6,775,711 | B1 | * | 8/2004 | Akimoto ....................... 709/245 |

FOREIGN PATENT DOCUMENTS

| | | |
|---|---|---|
| EP | 0825752 | 2/1998 |
| GB | 1435945 | 5/1976 |
| WO | WO 99/64972 | 12/1999 |
| WO | WO 00/41366 | 7/2000 |

* cited by examiner

*Primary Examiner* — Peling A Shaw
(74) *Attorney, Agent, or Firm* — Christie, Parker & Hale, LLP

(57) ABSTRACT

A communication system is provided in which users associate handling data identifying how messages are to be processed with contact data. Handling data for the identified contacts in the contact data then dispatched to those contacts. Subsequently when messages are dispatched from the locations identified by the contact data a sender of a message selects handling data to be associated with a message being dispatched. Upon receipt of a message associated with handling data the message is then processed in the manner identified by the handling data.

3 Claims, 17 Drawing Sheets

SYSTEM, METHOD AND COMPUTER PROGRAM FOR RECIPIENT CONTROLLED COMMUNICATIONS

CROSS-REFERENCE TO RELATED APPLICATION(S)

This application is a continuation application of, and claims priority to and the benefit of, U.S. patent application Ser. No. 10/475,138, entitled "System, Method And Computer Program For Recipient Controlled Communications," filed on Nov. 7, 2003, which is a national stage application of PCT International Application No. PCT/CA02/00561, U.S. Pat. No. 7,765,252 entitled "Communications System," filed on Apr. 22, 2002, which claims priority to and the benefit of U.K. Patent Application 0109808.6, entitled "Communications System," filed on Apr. 20, 2001 in the United Kingdom Patent Office.

FIELD OF THE INVENTION

The present invention concerns communications systems. In particular the present invention concerns communications systems in which messages and data are transmitted between different locations.

BACKGROUND

Modern communication systems such as mobile phones, e-mail and the Internet have greatly increased the ability of individuals to send, request and receive information. However, as this enhanced communications ability has resulted in increased information flow, it has also given rise to inefficiencies due to the need to sort received information to determine which items of information are important and which items of information are less important.

A number of systems have been proposed to automate the sorting of received information. These systems include known electronic mail filtering systems such as that disclosed in WO00/41366 which automatically stores emails received from identified addresses in defined files. Also, systems are known such as that disclosed in U.S. Pat. No. 5,329,578 which automatically forwards telephone calls from defined locations based upon recognition of caller identification data. Although such systems do automate the sorting of received information, the prior art systems are based upon the assumption that all messages from specified locations should be treated in a similar manner. Where individual needs for messages from the same location vary over time, this generally requires receivers to reconfigure their sorting systems. The systems are therefore generally inefficient for processing messages where the requirements for processing messages from the same location vary over time.

Another alternative system for sorting emails is disclosed in U.S. Pat. No. 5,999,967 in which for different email addresses, a recipient identifies a value of a stamp required on an email, which was attached to the email by the sender. When email messages are received the filtering system checks whether a sufficiently high value stamp has been included within the message by the sender. If this is not the case the email is rejected or categorized as being lower in priority. This system is somewhat limited in its filtering accuracy and categorization of data in accordance with a variety of criteria.

An alternative system for automating the sorting of emails is to associate keywords with defined storage locations. When an email message is then received, a storage location for the message is selected based upon matching words in the subject line to the stored keywords. Although such systems enable users to vary the processing of messages from the same location, such systems are limited by the need for users to utilize the correct keywords in messages and may result in an inappropriate processing when keywords are used in ways other than those expected.

Another system is disclosed in WO99/64972 wherein the recipient can supply a set of categories to the sender and the sender selects from these categories when sending messages to the recipient. Upon receiving a message, the message is than sorted according to the receiver's categories. Although this particular system overcomes the need for users to utilize the correct keywords, it requires all senders to utilize the same set of categories when sending messages to the recipient. This particular system has somewhat limited sorting capability, when considering that it is desirable that categories be kept very general to be relevant to a relatively high number of potential future senders.

In another system, a telephone system is suggested EP0825752 in which a recipient provides senders with a set of extensions to be dialed when leaving a voice-message. This prior art system discloses providing different extensions to different users but does not appear to permit a mechanism that informs recipients of their then available extensions which renders the use of these extensions relatively cumbersome and rigid.

A still other prior art system for prioritizing electronic mail has been disclosed in WO99/64972 A2, where a sender categorizes an e-mail message bound for a recipient based upon predefined categories set by the recipient and provided to the sender. Categorized email messages are received by the recipient and are prioritized according to a priority level also predefined by the recipient for each category. The priority levels are not provided to the sender, minimizing potential abuse by incorrect categorization.

SUMMARY OF THE INVENTION

One object of the present invention is to provide a system, computer product and method for controlling the processing of messages.

The invention concerns a system, computer product and method that enables recipients of message to control how messages are processed. Specifically, the system enables messages to be appropriately processed without the need for prior review of messages whilst ensuring control over the processing is maintained. To achieve this, the system enables users to generate unique tags, which are associated with processes. Selections of tags are then distributed to potential senders of messages. When a message is to be sent, tags are associated with the message. Upon receipt of a tagged message, the message is processed in accordance with processes identified by the tags. The recipient maintains control of the processing of the messages firstly, by controlling which processes are associated with each tag, and secondly, by controlling the distribution of tags. The restricted availability of tags and the selection of tags by a sender enables messages to be appropriately processed. Processing includes, but is not limited to categorization of messages in accordance with predetermined criteria.

Another aspect of the present invention is a system, computer product and method that enables the tags to be updated at computers associated with the potential senders of messages.

In accordance with one aspect of the present invention a system for controlling the processing of data that is communicated between a first computer and a second computer, wherein said first computer and second computer are connected to an interconnected communication network, said system comprising a means for permitting the selection from a group of processing criteria one or more particular processing criteria for processing communications dispatched by said second computer to said first computer; and a means for processing communications dispatched by said second computer to said first computer in accordance with said particular communication processing criteria.

One of the advantages of the present invention is that the present invention permits the structuring of incoming data according to personally predefined categories allowing the viewer to decide on which category of messages to focus on. This would include the possibility of hiding certain messages associated with certain categories only to appear visually at predefined times of the Year/Month/day/Time/Date.

Another advantage of the present invention is that it permits junk mail filtering in that, for example, emails that are not categorized in accordance with the receiver determined categories will be kept separate from all other emails which are associated with the receivers categories.

A still other advantage of the present invention is that it permits flexible automatic processing of messages based on the dispatcher of the message. For example, such processing includes automatic printing of received/sent messages and attachments; automatic forwarding of messages to different location/devices; activation of different security measures/policies, depending on the particular processing criteria selected for messages from a dispatcher.

It also should be understood that the flexible automatic processing of messages based on the dispatcher of the message permits the processing criteria to be varied depending on time.

Another advantage of the present invention is that it permits the creation of structured forms for controlling the processing of messages as between a first computer and a plurality of remote computers. The structured forms of the present invention allow a user to view only preselected data at a messaging device, processed in accordance with preselected processing criteria.

Another advantage of the present invention is that it provides means for structuring data in a business knowledge database from a plurality of sources whereby collection/processing of data at one or more servant terminals is controlled by one or more control terminals.

A still other advantage of the present invention is the provision of communication devices wherein the signal of the communication device is controlled to be engaged only upon receipt of a message that meets selected processing criteria. The signal may include a ring tone, or visual message notification.

DESCRIPTION OF THE DRAWINGS

Further aspects and embodiments of the present invention will become apparent in the light of the following description with reference to the accompanying drawings, in which.

Similar parts are denoted with similar numerals throughout the various Figures.

DETAILED DESCRIPTION OF THE INVENTION

Figure 1:
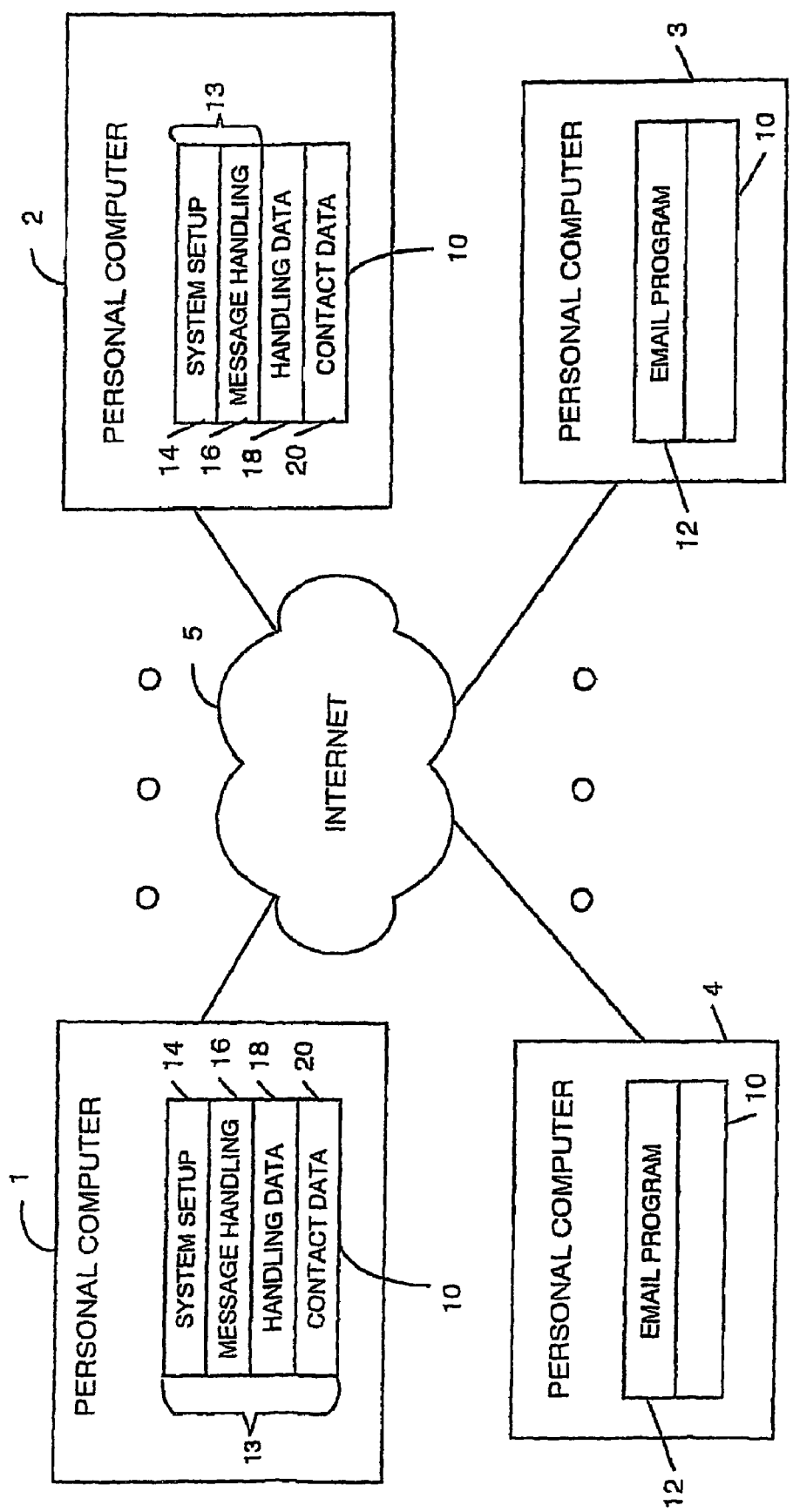
FIG. 1 is a schematic block diagram of a computer network including a first embodiment of the present invention.

The invention concerns a system, computer product and method that enables recipients of messages to automate how messages are processed. Specifically, the present invention enables messages to be processed in accordance with desired criteria without the need for preview of messages while ensuring control over the processing is maintained. To achieve this, the system enables users to generate processing criteria. These processing criteria are unique tags associated with the processing criteria.

A selection of tags is then distributed to potential senders of messages. When a message is to be sent, a sender then selects from the received tags, the particular tags to be associated with the message.

Upon receipt of a tagged message, the message is processed in accordance with processes identified by the tags.

The recipient maintains control of the processing of the messages firstly, by controlling which processes are associated with each tag, and secondly, by controlling the distribution of tags. The restricted availability of tags and the selection of tags by a sender enables messages to be appropriately categorized and hence appropriately processed.

Although in the above description upon receipt of a tagged message, the message is processed in accordance with processes identified by tags, systems can be provided where the tagged message can additionally be processed in accordance to other predefined processing criteria specified by the recipient. In such a system, processing is performed on messages in accordance with processes identified by the tags associated with the message, and in accordance with other recipient defined processing criteria which may depend on the current requirements or context of the recipient such as the current project being worked on when the message is received. Specifically, the recipient may specify an item of data that represents the current project the recipient is currently working on, or the current type of tasks the recipient is currently performing. Upon receiving a tagged message, such data may then be compared with tags associated with the message, in order to determine the relevance of the message to such current project or type of tasks. In case of a match, the present invention can alter the recipient of the received message, or store or forward the message in accordance to predefined processing criteria.

It should be understood that the present invention contemplates distribution of tags by means of an intermediary server where such tags are stored on behalf the sender, and then distributed to the sender at a later point in time, such as when the sender composes a message to the recipient. In such a system the distribution of tags from the intermediary server to the sender would occur after a specific request is made to the intermediary server by the sender's system to retrieve the senders tags that where provided to the sender by the recipient, and were stored on the intermediary server. Alternatively, a server part of the sender's computer product of the present invention may reside on the intermediary server and maintain and manage user accounts, and a client part thereof may reside on the user's system. This particular embodiment of the present invention extends to web applications such as HOTMAIL.COM™ and similar web-based email messaging software. In such a system, the distributed tags are made immediately available to the user's email account on the intermediary server, and are retrieved and used when the sender composes a message using his/her regular client software.

Although in the above description when data including a message is to be sent, a sender selects from the received tags particular tags to be associated with the message, the present invention also contemplates application of the present invention where some or all received tags are selected by automatic processes prior or after dispatch of the message. Additionally, some or all received tags could be selected by a user other than the sender on behalf of the sender and included in the message prior or subsequent to dispatching a message. In such a particular embodiment, the recipient would distribute a selection of tags to such other users to be used on behalf of the sender. Alternatively, or additionally, the sender, with permission of the recipient may further distribute some or all of the received tags to such other users. As a still further alternative, the recipient may pre-select on behalf of the sender, some or all of the tags prior to sending a message to the sender, to be used as default values when the sender receiving this message from the recipient, replies to this email message to the recipient, or forwards this message to another recipient.

Although in the above description processing of messages in accordance with each tag associated with the message occurs upon receiving of a message, it should be understood that the present invention also contemplates a system, computer product and method whereby processing occurs during the selection of tags from the received tags, in accordance to the tags to be associated with the message. In addition, processing may occur at any other time prior and during dispatch of the message in accordance with processes identified by the tags associated with the message sent to the recipient. For example, upon selecting a particular categorization of data including messages, an associated process displays a predefined user interface for composing a message in accordance with the category. In addition, upon selecting a category an associated process can retrieve data from the sender's system or from related systems. These systems may include systems administering aspects of the sender's work; sensing devices for detecting parameter events in the physical environment of the sender, and so on.

Control Data

Although in the above description, at least one selection of tags is distributed to potential senders, it should be understood that the present invention also contemplates distribution of control data related to such tags to potential senders of messages in addition to the tags themselves. Such control data may provide additional control over how messages categorized with said tags are to be composed by the sender. For example, control data may specify a particular user interface for data entry to be used when composing a message that is categorized with said tags. Alternatively, control data may further parameterize the processing of messages associated with their corresponding tags. For example, additional information on the format or network protocol to be used when decoding or transmitting the message. Alternatively, control data may include additional directives to processes that are performed on the messages categorized with corresponding tags prior to, during or after dispatch of the message. Alternatively, control data associated with tag data may specify directives to the sender's system to periodically or upon the occurrence of certain events invoke processes that generate a message, and automatically categorize said message with said tags and include additional data in accordance with the control data that is associated with said tag. For example, a tag received by a sender's system may specify in its associated control data, that on an hourly basis processes on the user's machine are invoked that measure medical values through sensors that are attached to the sender and connected to the senders system. Such a system may also periodically prompt the sender to provide a report on his/her current well-being or to specify whether certain symptoms have presented themselves. Such data would then be included into a message that is automatically generated and categorized with said tags and sent to the recipient.

It should also be understood that the recipient himself/herself may also control the processing of data received from remote locations, including messages, by selecting among tags related to processing criteria that apply to the recipient's computer. This is particularly relevant in applications where there is a "REPLY" to a message received in accordance with processing criteria of the present invention. For example, additional processing criteria may establish that upon such a "REPLY" the processing criteria of the sender become the recipient's current processing criteria. Or similarly, in regard to a browser implementation of the present invention, the receipt of a message from a sender, associated with processing criteria, may result in generation of a reply web-page which is associated with said sender's processing criteria.

Summary of the Various Embodiments

In a first embodiment of the present invention (further described below), both the sender and the recipient are users of an email program. The messages transmitted are email messages. The recipient is in control over the automatic processing of email messages. The recipient can associate processes that process incoming email messages with predetermined processing criteria and can distribute a selection of processing criteria to a sender, thereby restricting the choice of available for processing of email messages for that sender.

In a second embodiment of the present invention (further described below) the sender and the recipient are users of synchronous communication equipments for voice, such as, but not limited to telephones or mobile phones, video or multimedia conferencing equipment, instant messaging software, such as online chatting, or paging equipment calling for the recipients attention. The messages transmitted are signaling messages, which indicate the request of a sender to communicate synchronously with the recipient, that is, to call a recipient, or the wish of a sender to have the attention of the recipient. The recipient is in control over the automatic processing of such signaling messages and the processing of subsequent incoming voice, text or multimedia transmissions. The recipient can associate processes that process incoming signaling messages with processing criteria, and can distribute a selection of processing criteria to a sender, thereby restricting the choice of processes available for processing of signaling messages and subsequent processing of voice, text or multimedia transmissions for that sender. Processes that are associated with processing criteria can compare processing criteria identified by tags in messages with the recipient's status data to determine whether to accept the signaling request and establish a synchronous connection or whether to process the signaling in other ways, for example redirecting the voice signaling request to a voice message mailbox storage server, for storing a voice message for future reference, or redirecting or forwarding the voice signaling request to different recipient. Other recipient status data may indicate the type of media requested for communication, for example, a request to establish an additional video communication channel, or the establishing of a communication link between the recipient's and the senders' collaborative work software.

In a third embodiment of the present invention (particularized below), the senders and the recipient are users of an email program connected to a main server. The messages transmitted are email messages. Processing criteria include category data stored on the server. The recipient is in control over what messages categorized with what categories and at what point in time, which are sent to the server, are forwarded from the server to his/her email program.

In a fourth embodiment of the present invention (detailed below) processing criteria, processes and potential senders and recipients are made available on a server and distributed to recipients requesting such data.

In a fifth embodiment of the present invention (also particularized below), the recipient is a subscriber using an email program and a web-browser client software. The sender is a web-subscription server application. The recipient while using the web-browser client software transmits a subscription request to the web-subscription server, and associates to this subscription request a selection of tags, and also preselects said selection of tags to be associated with email messages subsequently sent from the web-subscription server to the recipient. Tags are preselected based on categories of subscription messages sent from the subscription server to the recipient. For example, messages pertaining to the management of the subscription are preselected with a tag representing the recipient's processing criteria associated with the receiving of subscription management related messages. Similarly, messages pertaining to the actual subscription contents are preselected with a tag representing the recipients processing criteria associated with the receiving of subscription related contents. Subscription servers may alert subscribers of new subscription categories, which the recipient may include as processing criteria and thereby associate a process for processing email messages with such new subscription categories sent from the web-subscription server.

Alternatively, in the fifth embodiment the present invention, the recipient is a browser of web-pages. Sender selects and preselects categories when sending a web-page browsing request. The web-server application then processes the web-page in accordance with the preselected categories and returns the web-page data associated with tags in accordance with said preselected categories.

In a sixth embodiment of the present invention (also detailed below), the recipient is performing an online transaction. The transaction request message is associated with preselected categories which are then associated with the transaction. Upon receiving a notification message of that transaction said preselected categories are associated with the notification messages. Additionally, processing occurring on transaction and database servers are processed in accordance with said preselected categories.

Terminology Used in the Description

It should be understood that the present invention uses messages in the general sense of the word to include communication of data, including communication of data within a known data processing system. Therefore, while the present invention contemplates implementation in the context of a communication system that may include, as discussed, email facilities, web browsing facilities or voice communication facilities, it should be understood that the present invention also contemplates a data processing system that permits data processing in accordance with the processing criteria of the present invention.

For example, an Authority creates processing criteria and designates subsets of processing criteria to Categorizers. Categorizers then associates one or more processing criteria to data items and make them available to Processors. A Data-creator is an entity who creates data items and makes them available to the Categorizers. A Processor processes data items in accordance with their associated processing criteria. Data-creators may make data items available to one or more Categorizers. Categorizers may make the categorized data items available to other Categorizers. Processors may make unprocessed and processed categorized data items available to other Processors and Categorizers.

Similarly, throughout this disclosure, it should be understood that "sender" and "recipient", or "dispatcher" and "receiver" while being terms used often in the context of the context of email, these terms are meant in their more general sense, namely to denote the sending or dispatch, and receipt of data. As described herein, this sending and receipt of data in accordance with the present invention may occur in a voice communications system. In the context of data processing, in accordance with the roles defined above in relation to data processing, the "sender" is best understood as the "Categorizer" and the "Data-creator", whereas the "recipient" is best understood as the "Authority" and the "Processor".

Devices, Computer Programs and Protocols Contemplated by the Invention

As this invention relates generally to communication of data, the invention also contemplates the use of a variety of networks, devices or computer programs for communicating data. For example, the present invention is understood as a system that may use: existing messaging networks, protocols or computer programs, including but not limited to, email clients such as MS-OUTLOOK™ or Hotmail.com™ (as stated earlier); existing group-ware software, such as LOTUS DOMINO™, LOTUS NOTES™, MS-EXCHANGE™; existing on-line collaboration software or platforms such as iPULES PLATFORM™, NETMEETING™, or ICQ™ By way of example also, the present invention contemplates communication of data over a variety of messaging devices, generally described as "receiving units" or "dispatching units", such as: Pocket PCs including HP IPAQ H38070 POCKET PC™; personal digital assistants (PDAs) such as the PALM i705™, RIM 950™, VISOR TREO 240™; mobile phones such as ERICSSON's R380 World™ or the NOKIA 9210™; regular telephones, fax machines, and pagers such as the MOTOROLA T900™ two-way pager. The present invention also contemplates the use of a variety of communication protocols including TCP/IP, HTTP, H.232, SIP (Session Initiation Protocol), Email Transmission protocol (SMTP); Internet services like Instant Messaging services such as AOL INSTANT MESSENGER™, MSN MESSENGER™ or Web subscriptions services such as List Servers, News Groups, or web-based registration subscriptions; Wireless networks such as GPRS, WCDMA, EDGE, and UMTS (3G networks). Network services such as SMS, EMS. Public phone network (PBX) such as Intelligent Networks (IN) or Wireless Intelligent Networks (WIN) as well as Proprietary business switching networks. The present invention may be reduced to practice in relation to all of the foregoing by a person with ordinary skills in the art.

Aspects of the Invention

In accordance with one aspect of the present invention a system for controlling the processing of data that is communicated between a first computer and a second computer, wherein said first computer and second computer are connected to an interconnected communication network, said system comprising a means for permitting the selection from a group of processing criteria one or more particular processing criteria for processing communications dispatched by said second computer to said first computer; and a means for processing communications dispatched by said second computer to said first computer in accordance with said particular communication processing criteria.

In accordance with another aspect of the present invention there is provided a communications system comprising:

a receiving unit for receiving messages;

a plurality of dispatching units for sending messages; and a communications network for transmitting data between said receiving unit and said dispatching units, wherein said receiving unit is operable to associate a plurality of items of category data with selections of processes to be performed on messages and to associate said items of category data with selections of said dispatching units;

said receiving unit is operable to cause to be generated within selected said dispatching units means for associating one or more of said items of category data associated with said dispatching unit with a message for dispatch; and said receiving unit is operable upon receipt of a message associated with one or more items of category data to process said message in accordance with said selections of processes associated with said respective items of category data.

In accordance with this aspect of the present invention, as a receiver of messages is able to select the processes associated with items of category data and identify which categories are to be available to which dispatchers, the receiver is able to limit the processing which may be undertaken. However, as the dispatcher of a message selects the category or categories to be associated with a message from the categories made available by the receiver, it is possible to tailor the processing of individual messages without the need for the receiver to review the message prior to processing.

As mentioned earlier, in accordance with embodiments of the present invention, receivers are able to identify processes to be effected on messages both prior to and subsequent to dispatch. Thus for example messages might be encrypted prior to receipt and decrypted upon receipt. Alternatively processes associated with items of category data might define the manner in which a message is to be stored or forwarded.

In accordance with another aspect of the present invention a user interface initially prompts a user to input category data and a selection of the manner in which messages may be processed, by the receiver upon receipt or by a dispatcher prior to receipt. Data identifying these categories and processes is then transmitted to selected dispatchers of messages. Subsequently, when messages are to be dispatched from any of the selected dispatchers to the receiver, a sender of a message is presented with a further user interface which prompts the sender prior to sending a message to associate the message with one or more of the categories identified by data received from the receiver. After a message has been associated with one or more categories, the message is then processed in accordance with processes associated with the selected categories which are to be performed prior to dispatch. The message is then sent to the receiver where any processes associated with the selected categories to be performed upon receipt are then performed.

Thus, for example, a user might specify that in relation to messages from one remote location that one category of messages are to be stored in one location, another category of messages are to be automatically encrypted and then decrypted upon receipt, and a third category of messages are to be stored in another defined location with a copy being sent elsewhere. Category data identifying these categories, and data identifying the process associated with the categories, would then be sent to the remote location. Subsequently, when messages are dispatched from the remote location, the sender of messages is prompted to assign one or more categories to the message. The processing associated with the selected categories is then performed upon the message prior to and/or subsequent to the message being sent.

By prompting the sender of messages to select appropriate categories for a message being dispatched, a means is provided to enable the messages to be appropriately processed without the need for prior review by the recipient. However as only the category assigned to a message is selected by the sender whilst the actual processing to be performed and which categories available are set by the recipient of messages, inappropriate processing can be limited. Thus in this way the recipient of messages remains in control as to how messages sent to the recipient are to be processed.

In another embodiment of the present invention categories made available to a dispatching unit are stored centrally on a server. When the server is accessed by a sender, categories associated with specific dispatching units may be selected and associated with a message. The message is then dispatched to the server where it is processed before being forwarded to selected receiving units on the basis of categories associated with a message.

First Embodiment

With reference to FIG. 1, a number of computers 1-4 are connected to each other via the Internet 5. Some of the computers 3, 4 have stored within their memories 10 a conventional e-mail program 12, whilst the other computers 1, 2 have stored within their memories 10, a modified email program 13 which together enable the computers 1-4 to send email messages to each other via the Internet 5.

Modifications to an existing e-mail program so that it functions as a modified e-mail program 13 in accordance with this invention may include, but is limited to the following: modifying existing programming code of an email program when its source code is known and accessible; the creation of a new email program based on predefined conventional email programming libraries such as the JAVAMAIL™ Application program interface (API), the creation of add-in's that can be installed in existing e-mail programs, such as MS-OUTLOOK™, or any other means for extending the functionality of software programs known in the art.

The modified email program 13 described, in accordance with the first embodiment of the present invention enables email messages to be generated and transmitted. The modified email program also permits messages to be associated with predefined criteria, including criteria permitting the assignment of categories to messages, as well as automatic processing of messaged in accordance with the predefined criteria. This aspect of the invention has the advantage of providing efficient management of both received and transmitted messages. For example, different categories of transmitted messages might be automatically transformed from one format to another, automatically stored in different directories, or automatically forwarded to other defined locations.

For this purpose, the modified e-mail program 13 comprises: a system set up program 14 and a message handling program 16. The system set up program 14 in this first embodiment enables users to generate and store handling data 18 defining processing criteria, including control data and control processes to be performed on messages and contact data 20 associating groups of control data 20 with e-mail addresses of computers. The system set up program 14 also enables users to generate and store handling data 18 and contact data 20 in the memories 10 of other computers 1, 2 having a modified e-mail program 13 stored within their memories 10.

When a message is to be dispatched from a computer 1, 2 having a modified e-mail program 13 stored within its memory 10, the message handling program 16 then enables users to attach to messages to be transmitted, selected control data received from the intended receiver. When such a message is received by another computer 1, 2 having a modified e-mail program 13 stored within its memory 10, the message handling program 16 of the receiving computer acts in response to the control data attached to the message and handling data 18 stored in its memory 10 to process the received message in a manner identified by the control data.

By providing means to select appropriate control data for processing messages dispatched by a dispatching unit, an improved level of control over the processing of messages can be achieved. As the control data is separate from any text included within a message, the availability of different types of processing can be restricted to individuals to whom the control data is made available. Furthermore, by attaching control data to messages on the basis of user selections from a user interface, a means is provided to increase the likelihood such data is utilized in a consistent manner.

Additionally, means can be provided which automatically links particular control data to particular dispatched messages. Thus for example control data attached to a message might automatically be included in a reply. Thus in this way by attaching certain control data to an outgoing message, appropriate processing of a reply when received can automatically be achieved.

Before describing in detail the processing of the system set up program 14 and message handling program 16, the modules of the system set up program 14 and message handling program 16 and data structures for storing data as handling data 18 and contact data 20 will now be described with reference to FIGS. 2, 3 and 4.

Figure 2:
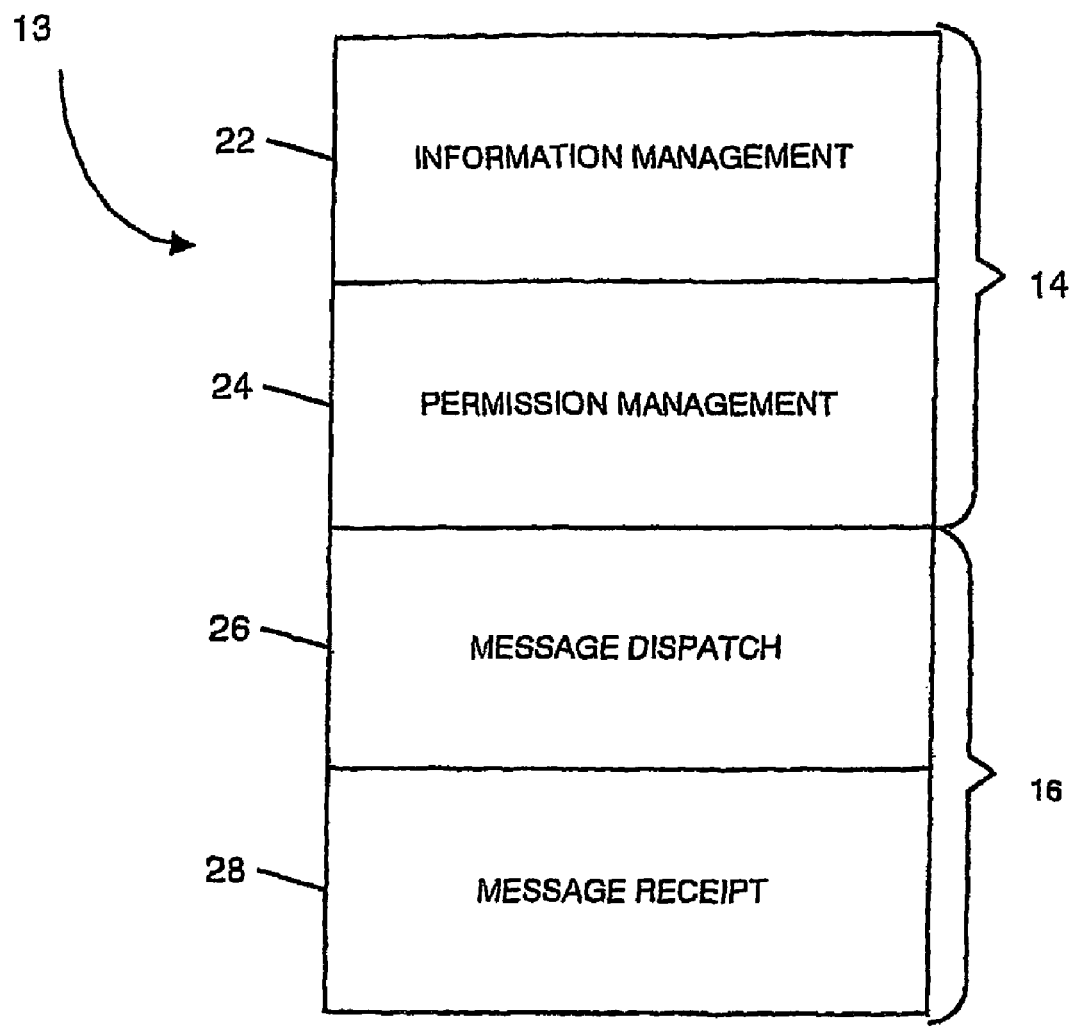
FIG. 2 is a schematic block diagram of program modules of a modified e-mail program in accordance with a first embodiment of the present invention.

FIG. 2 is a schematic block diagram of the modules of a system set up program 14 and message handling program 16 stored within the memory 10 of a personal computer 1, 2. In this particular embodiment of the present invention, each system set up program 14 comprises: an information management module 22 for generating and amending handling data 18; and a permission management module 24 for generating and amending contact data 20.

In this embodiment, the permission management module 24 comprises a program, which is arranged to generate records stored as contact data 20 which act to associate the addresses of other remote computers 1, 2 having a message handling program 16 stored within their memory, with selected items of handling data 18.

When the information management module 22 is utilized to generate or amend handling data 18 or the permission management module 24 is utilized to amend contact data 20, this causes the computer to dispatch via the Internet 5 one or more instructions to computers associated with the amended handling data 18 or contact data 20 to make a similar update to handling data 18 and contact data 20 stored in the memories of the identified remote computers. Thus, in this way, the information management module 22 and permission management module 24 act to cause handling data 18 stored on one computer to be reflected by similar handling data 18 stored in the memory 10 of other selected computers.

Each of the message handling programs 16 in this particular embodiment of the present invention comprises: a message dispatch module 26 for generating and dispatching messages; and a message receipt module 28 for processing messages received from the Internet 5. As is described in detail later, the message dispatch module 26 and message receipt module 28 interact with stored contact data 20 and handling data 18 so that the processing corresponding to a category assigned to a message, in this particular embodiment of the present invention, is performed prior to and subsequent to the dispatch of a message.

Figure 3:
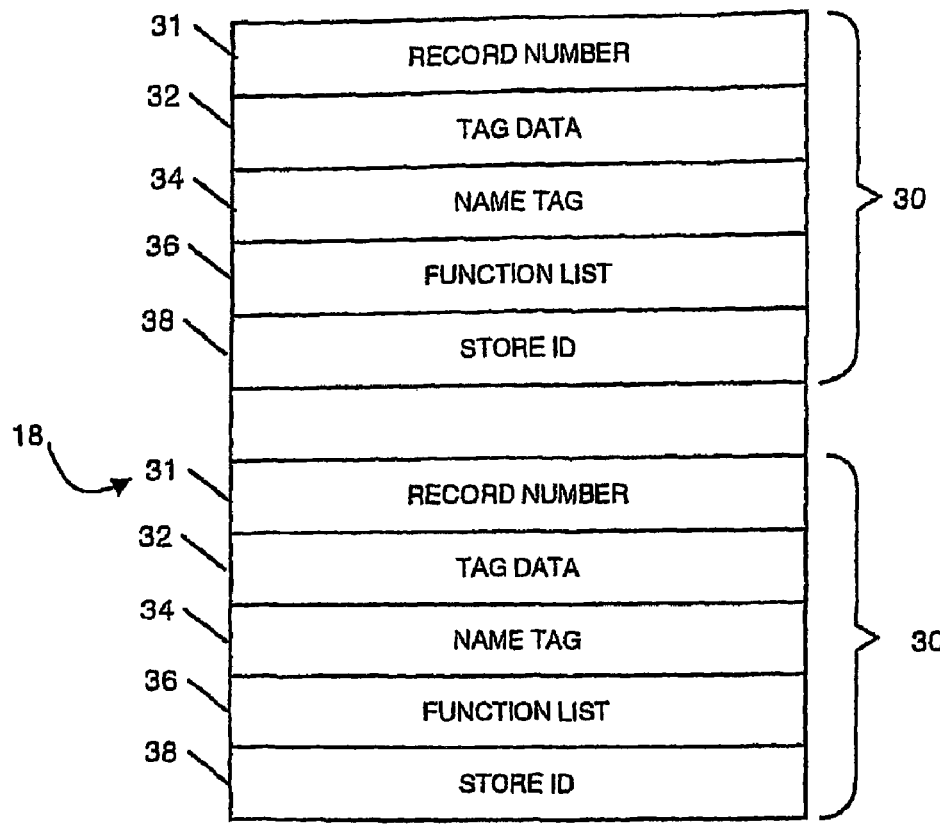
FIG. 3 is a schematic block diagram of handling data stored within the memory of a computer, in accordance with the present invention.

FIG. 3 is a schematic block diagram of handling data 18 stored within the memory 10 of a computer 1, 2. In this embodiment, the handling data 18 comprises a plurality of handling records 30. Each of the handling records 30 comprises: a record number 31 for identifying a record 30 within the memory 10 of the computer; tag data 32 being a uniquely generated identification number for the record 30; a name tag 34 being text data enabling users to identify categories corresponding to handling records 30 by name; a function list 36 being a list of data identifying one or more functions to be performed on a message either before or after dispatch; and store identification data 38 being data identifying one or more locations where a message can be forwarded to or stored. In this embodiment, the handling records 30 of the handling data 18 act to associate a function list 36 and store identification data 38 with tag data 32 and a name tag 34. This enables users by selecting a category identified by name tag 34 to indicate that the processing functions identified by function list data 36 and the store identification data 38 identifying one or more locations where a message can be forwarded to or stored, associated with the name tag 34, are to be performed upon a message prior or subsequent to dispatch.

Similarly, by incorporating within messages being dispatched tag data corresponding to tag data 32 of a handling record 30, a means is provided to indicate the functions identified by the function list 36 associated with the tag data 32 that should be performed upon a message incorporating specific items of tag data 32 and the locations where a message incorporating specific items of tag data can be, for example, forwarded to or stored.

Figure 4:
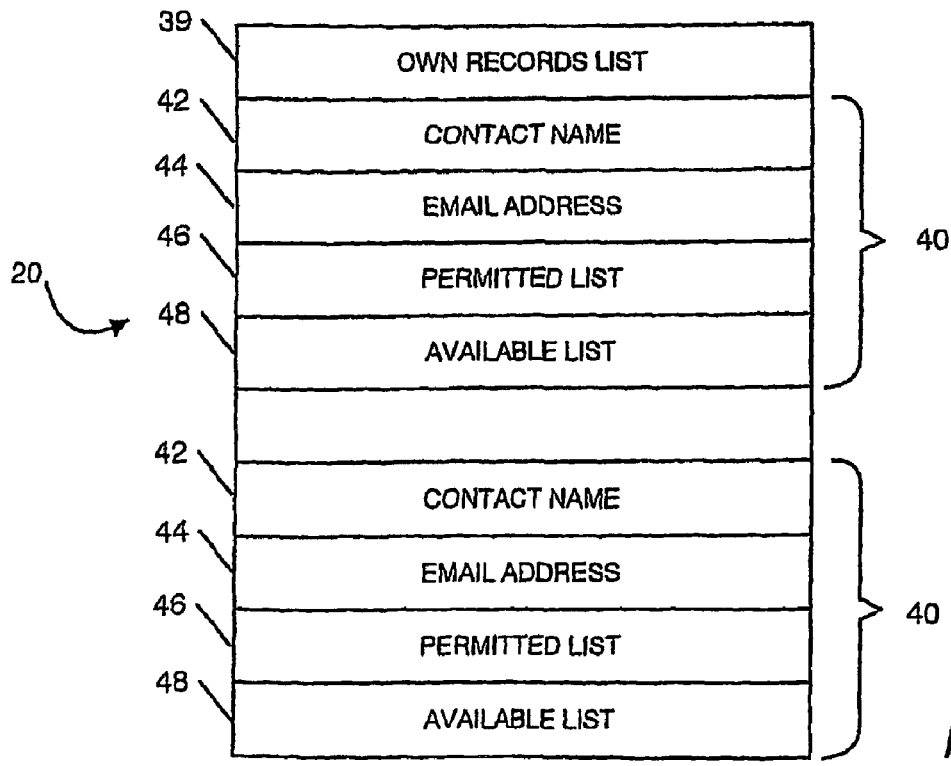
FIG. 4 is a schematic block diagram of contact data stored within the memory of a computer, in accordance with the present invention.

FIG. 4 is a schematic block diagram of contact data 20 within the memory 10 of a computer 1, 2. In this embodiment, the contact data 20 comprises: an own record list 39 being a list of record numbers 31 of handling records 30 directly generated locally by the information management module 22 of the system set up program 14 based upon user input; and a plurality of contact records 40.

Each of the contact records 40 in this embodiment comprises: contact name data 42 being text data for enabling users to identify remote computers; e-mail address data 44 being address data for routing messages to remote computers via the Internet 5, a permitted list 46 being a list of record numbers 31 of handling records 30 directly generated by the information management module 22 stored in the computer as a result of user input to the computer; and an available list 48 being a list of record numbers 31 of handling records 30 stored within the memory 10 of the computer as a result of data received from the computer identified by the email address 44 of the contact record 40.

By storing the own record list 39 and contact records 40 which each include an available list 48 and a permitted list 46, a means is provided to store data dividing the handling records 30 within the memory 10 of the computer into a number of groups. Specifically, the own record list 39 acts to define a first group of handling records 30 being handling records 30, which have been generated and stored as a result of direct user input into the computer. Secondly, the available lists 48 in each of the contact records 40 associates each of the remaining handling records 30 with an e-mail address 44 which identifies the computer from which the instruction to generate the handling record 30 was received. Finally, the permitted list 46 of each of the contact records 40 acts to associate a sub-set of the handling records 30 identified by the own record list 39 with each of the e-mail addresses 44 of remote computers identified by e-mail address data 44 of contact records 40.

As is described in detail later, the division of handling records 30 into these different groups is utilized by the system set up program 14 and message handling program 16 to enable a user to control the manner in which messages from identified remote computers are processed whilst permitting different messages from the same remote computer to be processed in different ways.

Figure 5:
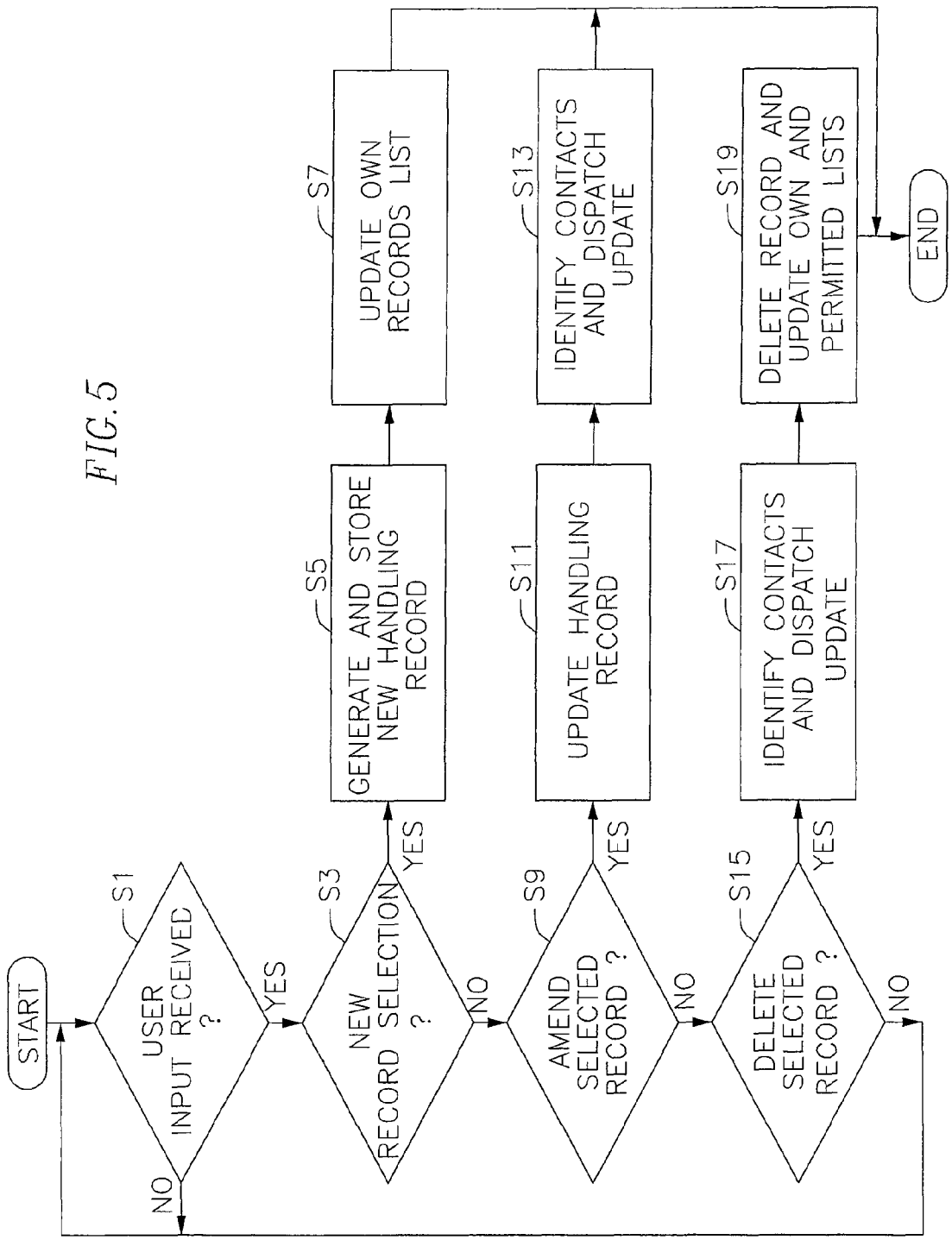
FIG. 5 is a flow diagram of the processing of an information management module for generating, amending and deleting handling records, in accordance with the present invention.

The processing of the information management module 22 of a system setup program 14 is now described with reference to FIGS. 5 and 6. FIG. 5 is a flow diagram of the processing of the information management module 22 of a system setup program 14. Initially, when the information management module 22 is invoked, this causes the computer 1 to display a user interface prompting a user to either indicate that they are entering a new handling record 30, select a previously stored handling record 30 to be amended, or select a previously stored handling record 30 to be deleted. The computer 1 then (S1) waits until a user indicates to the computer 1 a selection of either inputting a new record, amending a stored handling record 30 or deleting a stored handling record 30.

When user input is detected, the information management system 22 initially determines (S3) whether the user has input data indicating a new record is to be generated. If this is the case, the information management module 22 causes the computer 1 to display a user interface prompting the user to input a name tag and a selection of functions to be associated with that name tag.

Figure 6:
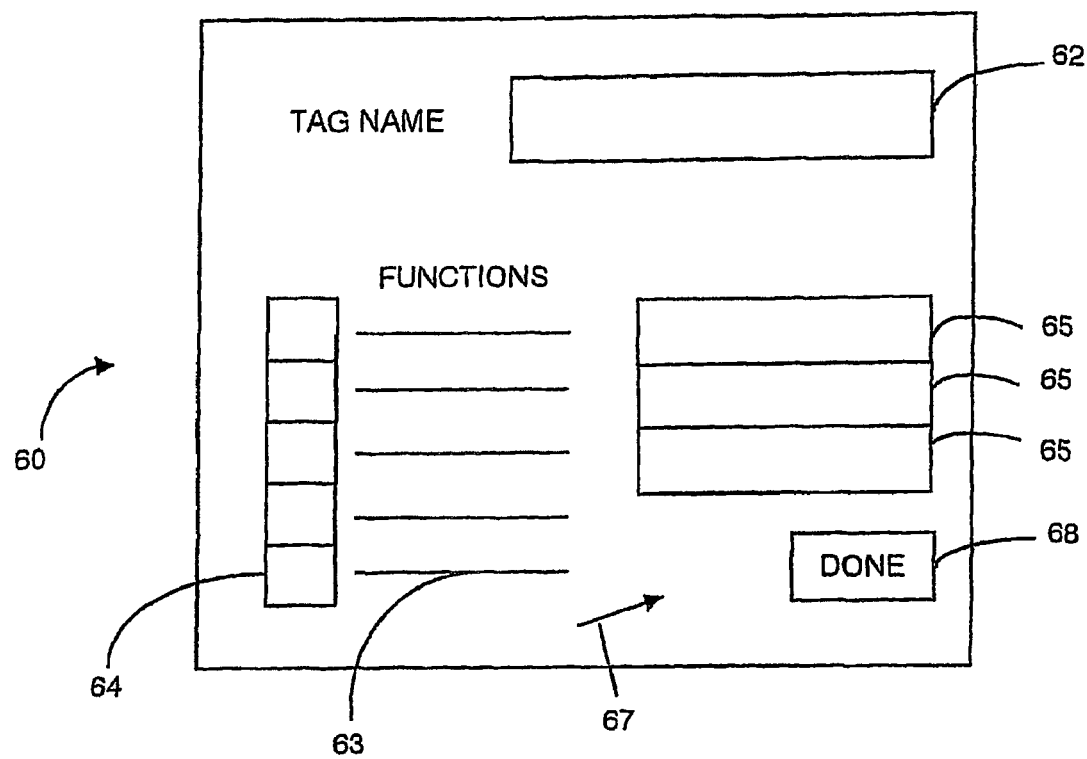
FIG. 6 is an illustration of an exemplary user interface for inputting data for generating handling records, in accordance with the present invention.

FIG. 6 is an illustration of an exemplary user interface for entering data for the generation of new handling records 30 or amending existing handling records 30. In this particular embodiment of the present invention, the exemplary user interface 60 comprises: a tag name window 62, a list of functions 63 and a series of check boxes 64 associated with each function in the list of functions 63. Also associated with some of the functions in the list of functions 63 are windows 65 for entering further data related to a function. Additionally the interface comprises: a pointer 67 and a done button 68. The user interface 60 is arranged to prompt users to input a name tag 34 and associate the name tag 34 with a function list 36 and store identification data 38. Specifically, the user interface 60 enables a user to control using a mouse or other control device, the pointer 67 to select any of the windows 62, 65 or check boxes 64. When a user selects one of the windows 62, 65 using a mouse or other control device, any data entered by the user utilizing a keyboard is caused to appear as text within the selected window. When the user has finished entering a selection of the check boxes and data in the tag name window 62 and other windows 65, a user then is prompted to select the done button 68 using the pointer 67 under control of a mouse or other control device to indicate that the user's selection is complete. In this particular embodiment, the list of functions 63 appearing in the user interface 60 identifies a number of functions that may be performed upon an email message.

Specifically, in this embodiment of the invention last described, the functions thereof comprise:

(i) automatically encrypting a message at the dispatching computer and decrypting the message upon receipt by a receiving computer;

(ii) forwarding a copy of a message being dispatched to another computer;

(iii) reformatting a received message and resending the message as a fax to a defined fax machine; or (iv) storing a received message as a file within a defined directory.

Thus, by making a selection of check boxes 64 associated with these four functions 63 and inputting data identifying where messages are to be copied to, faxed to or stored in etc., the user is able to input data identifying selection of functions be associated with a particular name tag 34, and thereby with a particular item of tag data 32.

It should be understood that the number of functions described is provided for illustrative purposes only. It would be obvious to a person skilled in the art to implement the present invention to include more or less such functions, as may be required. As mentioned earlier, these function, in accordance with the processing criteria contemplated by the present invention, may include means for presenting particular viewing or user interface elements, such as for example, list-boxes, or drop-down menus and the like.

It should also be understood that in relation to the first embodiment of the present invention described herein it is specifically contemplated to provide the control data of the present invention to dispatch units by including this control data as new functions to known email programs in a manner that is also known. This can be achieved using, for example, Dynamic Link Libraries (DLLs), plug-ins, add-in's, or by receiving the control data via the Internet as mobile code, where each newly added function is uniquely identified.

A still other implementation of the present invention, which is related for illustration purposes, is one in which tag data and functions lists described are associated in co-operation with computer controlled by an administrator or service provider whereby the tag data and functions lists are transmitted to the email program of one or more users of the present invention. Alternatively, such associations may reside on a separate computer and be transmitted as an email received by the email program. Alternatively, messages may be received and processed on behalf of the recipient on a separate computer in accordance with the tag data and functions, such that it is the result of such processing that is provided to the recipient.

When the user indicates that a selection is complete by selecting the done button 68 utilizing the pointer 67, the information management module 22 then generates (S5) a new handling record 30 which is stored in the memory 10 of the computer. The generated handling record 30 comprises: the next available record number 31 as a record number 31, generated tag data 32 being a new unique number unique to all the handling records 30 stored in any of the computers 1, 2 generated in a conventional way; a name tag 34 corresponding to text entered in the tag name window 62 in the user interface 60; a function list 36 comprising data identifying those functions selected as identified by the selections made in the check boxes 64 associated with the list of functions 63; and store identification data 38 corresponding to the data entered into the windows 65 associated with selected functions.

Thus for example if the following functions were selected from a list 63 of available functions:
1. Autoencrypt/Decrypt
2. Forward to JOHN@ADDRESS.CO.UK
3. Send as fax to 0207339182
4. Store in C:\MyDocument\Private\Bills Where, in accordance with the above, "JOHN@ADDRESS.CO,UK", "0207339182" and "C:\WyDocument\Private\Bills" all comprise text entered in windows 65 associated with the forward to, send as fax to and store in functions in a displayed function list 63, the following handling record 30 would be generated where 32 was the next available record number, 1319100312 was unique generated tag data and text within the tag name window 62 was "Project Credit Control":

Handling record
Record no: 32
Tag Data: 1319100312
Name Tag: Project Credit Control
Function list: 1,2,3,4
Store ID: 2-JOHN@ADDRESS.CO.UK
3-0207339182
4-C:\My Document\Private\Bills Once a new handling record 30 has been generated and stored within the memory 10 of the computer, the information management module 22 then (S7) causes the record number 31 of the newly generated record to be appended to the own record list 39 stored within memory 10. Thus in the case of the handling record 30 above, the number 32 is appended to the own records list 39 stored in memory 10. After the own record list 39 has been updated, processing by the information management module ends.

Returning to FIG. 5, if the information management module 22 determines that the detected user input is not an indication of a request to generate a new record (S3), the information management module 22 then (S9) determines whether a user has selected an existing handling record 30 for amendment. (S9).

If this is the case, the information management module 22 retrieves from memory 10 the handling record 30 corresponding to the record selected to be amended, and displays to a user a user interface similar to the user interface 60 utilized to input data to generate a new handling record 30. In this user interface, however, text data and selection data are displayed within the tag name window 62, check boxes 64 and input windows 65 corresponding to the text data and selection data previously entered for generating the selected record.

The user is then prompted to amend the displayed user interface 60 by altering the displayed selection data and text data. When the user has finished amending the displayed selections and text data, the user selects utilizing the pointer 67 the done button 68. The information management module 22 then causes (S11) the name tag 34, function list data 36 and store identification data 38 of the selected handling record 30 to be updated to correspond to the text and selection data displayed in the windows and check boxes 62, 64, 65.

After the handling record 30 stored within the memory 10 of the computer has been updated, the information management module then (S13) generates a list of email addresses 44 of the contact records 40, wherein the permitted list 46 of the contact record 40 includes a reference to the record number 31 of the newly amended handling record 30. The information management module 22 then causes to be dispatched via the Internet 5 to the addresses in the generated list an email message incorporating instruction to overwrite a handling record 30 including the tag data 32 of the selected handling record 30 to be amended to reflect changes to the amended handling record 30 stored in memory 10. In this embodiment, these instructions incorporate partial copies of the amended handling record 30 in which the function list 36 and store identification data 38 is filtered to remove data relating to processes to be performed upon receipt of a message.

As is described in detail below, when the message is received by the computers identified by the email addresses 44, this causes a handling record 30 within the memory of the computers identified by the email addresses 44 to be updated so that the name tag 34, function list 36 and store identification data 38 of the copy of the handling record 30 on the remote computer corresponds to the name tag 34, and parts of the function list 36 and store identification data 38, of the updated handling record 30 within the memory 10 of the computer from which the instruction to update was dispatched.

If the information management module 22 determines (S9) that the detected user input is not a selection of an existing handling record 30 for amendment (S9), the information management module 22 then (S15) determines whether a user has selected an existing handling record 30 for deletion.

If this is not the case the information management module 22 waits (S1), once again for user input before determining the type of user input detected. If, however, the information management module 22 determines that an existing handling record 30 has been selected for deletion, the information management module 22 then (S17) generates a first of e-mail addresses 44 of contact records 40 where the permitted list 46 of the contact record 40 includes a reference to the record number 31 of the handling record 30 to be deleted. The information management module 22 then causes to be dispatched via the Internet 5 to the addresses in the generated list an instruction to delete the handling record 30 including tag data 32 corresponding to tag data 32 of the selected handling record 30 to be deleted and for contact records 40 stored on the remote computers to be amended so that references to the deleted record in available lists 48 are also deleted.

As is detailed below, when the message is received by the computers identified by the email addresses 44, this causes the handling record 30 within the memory of the computers identified by the email addresses 46 incorporating the tag data 32 of the selected record to be deleted, and the available lists 48 of contact records 40 stored in the remote computers to be amended.

After instructions have been dispatched by the information management module 22 to delete the selected handling record 30 from the memories of the computers identified by email addresses in the generated list, the information management module 22 then (S19) proceeds to delete the selected handling record 30 from the memory of the computer 10. The information management module 22 then amends the own record list 39 and permitted lists 46 of contact records 40 within the memory 10 of the computer by deleting references to the record number 31 of the deleted handling record 30 from the own records list 39 and permitted lists 46 of contact records 40 where the record number 31 is included in those permitted lists 46. The processing of the information management module 22 then comes to an end.

The processing of the permission management module 24 of the system setup program 40 will now be described with reference to FIGS. 7 and 8.

Figure 7:
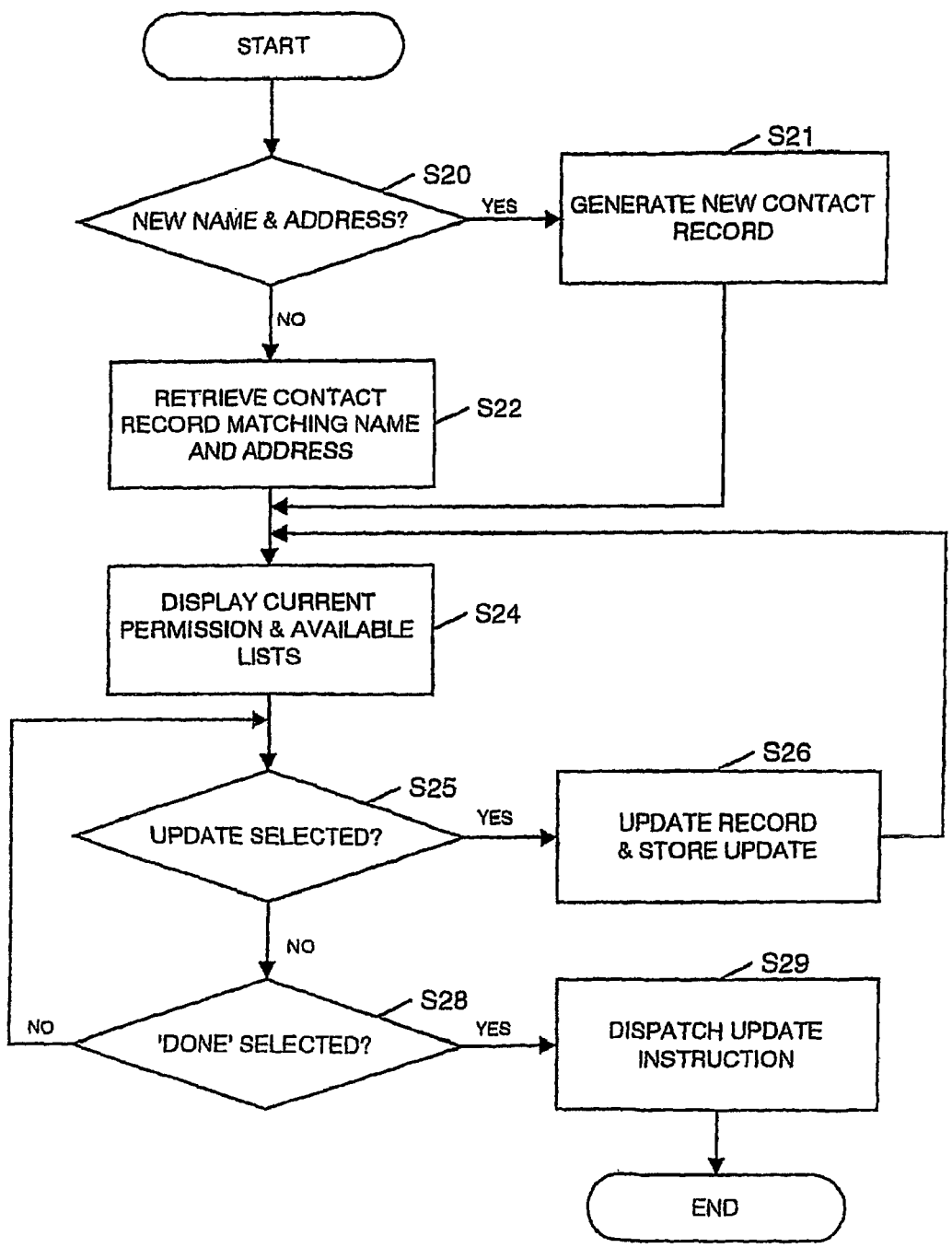
FIG. 7 is a flow diagram of the processing of a permission management module for generating and amending contact records, in accordance with the present invention.
Figure 8:
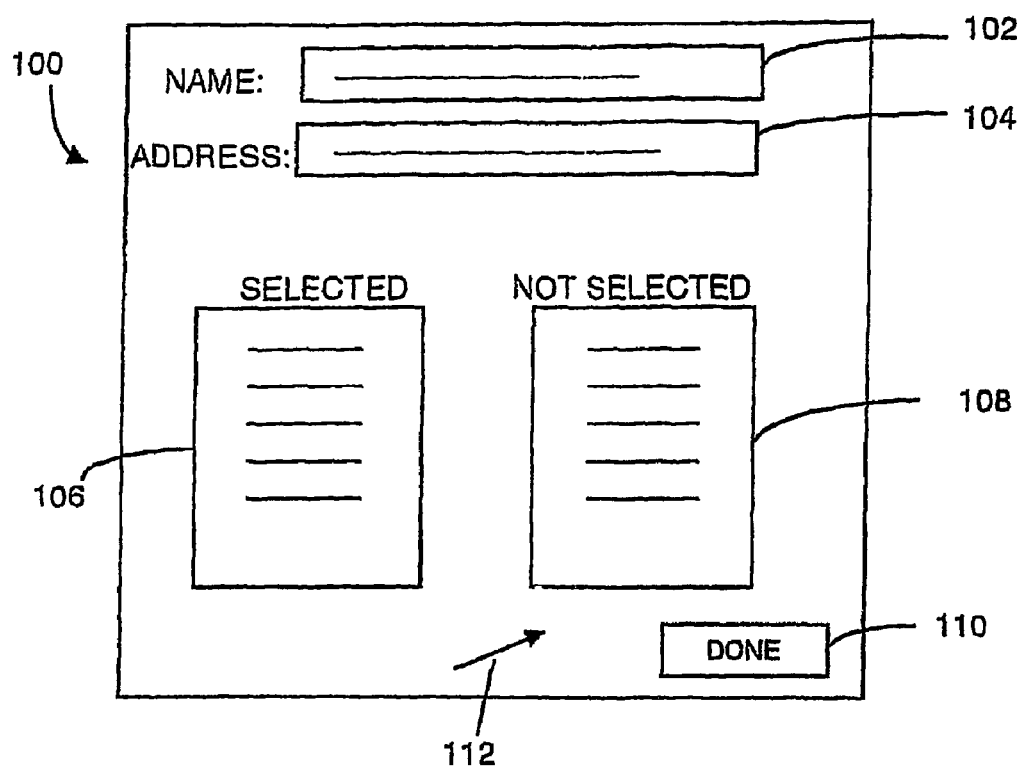
FIG. 8 is an illustration of an exemplary user interface for amending contact records, in accordance with the present invention.

FIG. 7 is a flow diagram of the processing of the permission management module 24 in accordance with this embodiment of the present invention.

The permission management module 24, is invoked whenever a user wishes to alter the permitted list 46 of contact records 40 stored as contact data 20. When the permission management module 24 is invoked, initially the permission management module 24 displays a user interface prompting a user to enter a contact name using the keyboard of a computer 1, 2. FIG. 8 is an illustration of an exemplary user interface 100 in accordance with this embodiment of the present invention. The exemplary user interface 100 in this embodiment comprises: a name window 102, an address window 104, a selected window 106, a not selected window 108, a done button 110 and a pointer 112 which can be controlled utilizing a mouse or other control device. Initially when the user interface 100 is displayed each of the windows 102-108 is empty. Utilizing the pointer 112 under the control of a mouse or other user input device, a user is then prompted to select any of the windows 102-108. When a window is selected the permission management module 24 is arranged to cause any text entered using the keyboard of the computer to be displayed in the selected window 102-108.

After an initial user interface screen 100 has been displayed the permission management module 24 then (S20) determines whether text entered into the name window 102 and address window 104 corresponds to a contact name 42, and e-mail address 44 of a contact record 40 stored within the memory 10 of the computer.

If this is not the case, and text corresponding to a new name and address have been entered into the name window 102 and address window 104, the permission management module 24 then (S21) generates a new contact record comprising a contact name 42 corresponding to the text entered within the name window 102, an email address 44 corresponding to text entered in the address window 104 and an available list and a permitted list 48, 46 comprising empty lists.

If, instead, text entered into the name window 102 and address window 104 is determined (S20) to correspond to a contact name 42 and email address 44 of a contact record 40 stored within the memory 10 the permission management module 24 then (S22) retrieves from the memory 10 the contact record 40 including the contact name 42 and email address 44.

After either the new record has been generated (S21) or an existing record has been retrieved (S22), the permission management module 24 then (S24) causes to be displayed within the selected window 106 a list of name tags corresponding to the name tags 34 of the handling records 30 having record numbers 31 contained within the permitted list 46 of the selected contact record 40.

In the case of a newly generated record, this permitted list 46 will be an empty list and therefore no name tag data 34 will be displayed within the selected window 106.

The permission management module 24 then causes to be displayed within the not selected window 108 name tags 34 for handling records 30 having record numbers 31 corresponding to records within the own record list 39 which do not appear in the permitted list 46 of the currently selected contact record 40. Thus, in this way all of the name tags 34 of records having record numbers within the own record list 39 are displayed either in the selected window 106 where the record numbers 31 of the handling records 30 appear as part of the permitted list 46 of the currently selected contact record 40 or alternatively within the not selected window 108, where the record numbers 31 of the handling records 30 do not appear within the permitted list 46 of the currently selected contact record 40.

After lists of name tags 34 have been caused to appear within the selected window 106 and not selected window 108, the permission management module 24 then (S25) determines whether a user has selected with the pointer 112 any of the name tags 34 displayed within the selected window 106 or the not selected window 108. If the user is determined to have selected using the pointer 112 one of the name tags 34 displayed within either of the windows 106 or 108, the permission management module 24 then (S26) causes the currently selected contact record 40 to be updated.

Where one of the name tags 34 displayed within the selected window 106 is selected, this causes the permission management module 24 to delete the record number 31 of the handling record 30 including corresponding name data 34 from the permitted list 46 of the currently selected contact record 40. In the case of the selection of a name tag 34 from the name tags 34 displayed within the not selected window 108, this causes the permission management module 24 to add the record number 31 of the handling record 30, including corresponding name tag 34, to the permitted list 46 of the currently selected contact record 40.

The permission management module 24 then (S24) causes to be displayed within the selected window 106 an amended list of name tags 34 corresponding to the name tags 34 of the handling records 30 identified by record numbers 31 in the amended permitted list 46 of the selected contact record 40. The permission management module 24 also causes to be displayed within the not selected window 108 name tags 34 for the handling records 30 having record numbers 31 corresponding with records within the own record list 39 which do not appear in the amended permitted list 46 of the current selected contact record 40. Thus, in this way a user is able, by selecting name tags 34 from the lists displayed in the selected and not selected windows 106, 108, to alter the record numbers 31 included in the permitted list 46 of the selected contact record 40.

After an updated user interface 100 has been displayed, the permission management module 24 then once again (S25) determines whether the user has utilized the pointer 112 to select any of the name tags 34.

If the permission management module 24 determines (S25) that a user has not selected any of the name tags 34 displayed in the selected window 106 or the not selected window 108, the permission management module 24 then (S28) determines whether the done button 110 has been selected. If this is not the case the permission management module 24 determines once again (S25) whether the user has selected any of the name tags 34.

Then, the permission management module 24 determines (S28) that the done button 110 has been selected, the permission management module 24 then (S29) causes to be dispatched a message to the email address 44 of the currently selected contact record 40 an instruction to update the contact data 20 and handling data 18 in the memory 10 of the remote computer identified by the e-mail address 44, incorporated in the amended contact record 40. Specifically, as will be described in detail later, data is dispatched to the identified e-mail address including copies of the updated contact record 40 and partial copies of the handling records 30 identified by the permitted list 46 of the updated contact record 40. This data is then processed upon receipt to amend handling data 18 and contact data 20 stored in the remote computer 1, 2 identified by the e-mail address 44. After the instruction has been dispatched the processing of the permission management module 24 comes to an end.

The processing of the message dispatch module 26 of a message handling program 16 will now be described in detail with references to FIGS. 9, 10 and 11.

Figure 9:
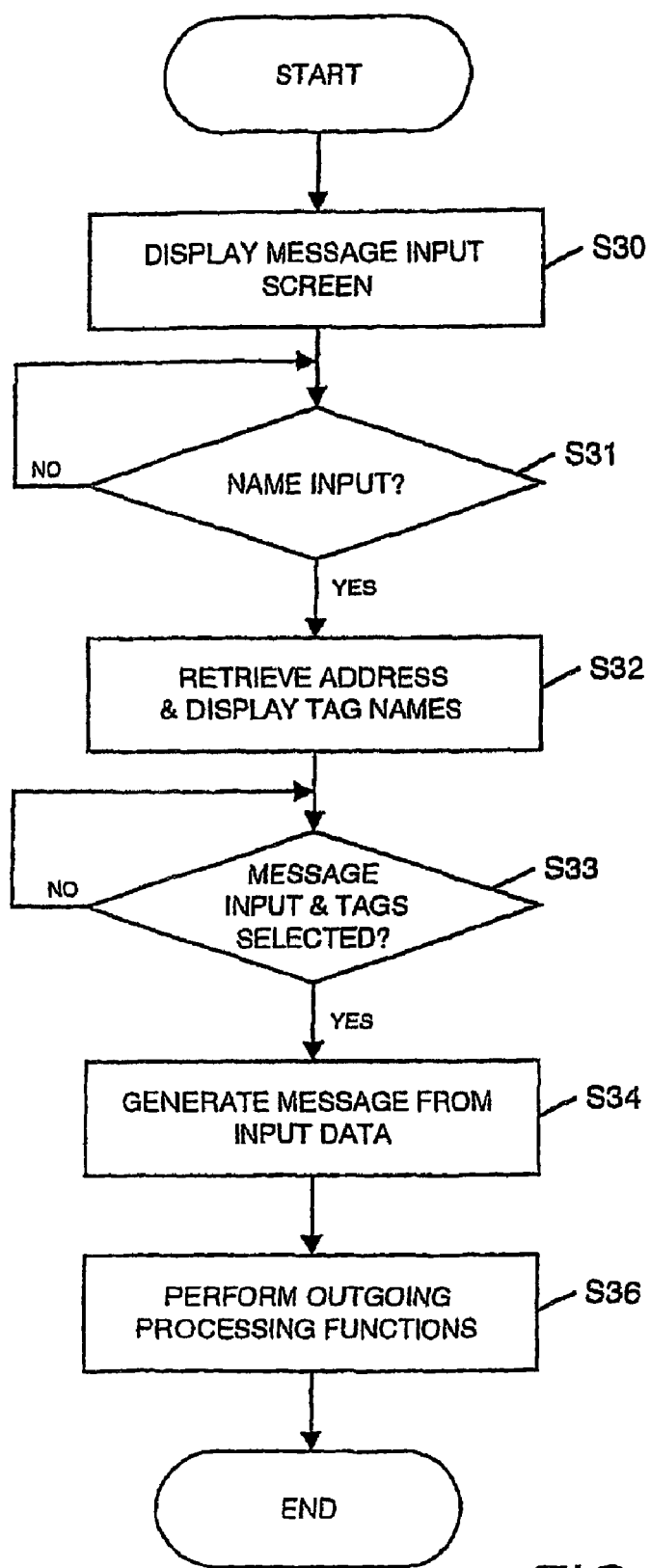
FIG. 9 is a flow diagram of the processing of a message dispatch module, in accordance with the present invention.

FIG. 9 is a flow diagram of the processing of a message dispatch module 26 of a message handling program 16. The message dispatch module 26 is invoked whenever a user wishes to send a message via the Internet 5.

Initially (S30), when the message dispatch module 26 is invoked, this causes the computer 1 to display a user interface prompting the user to enter the name of an individual to which a message is to be sent.

Figure 10:
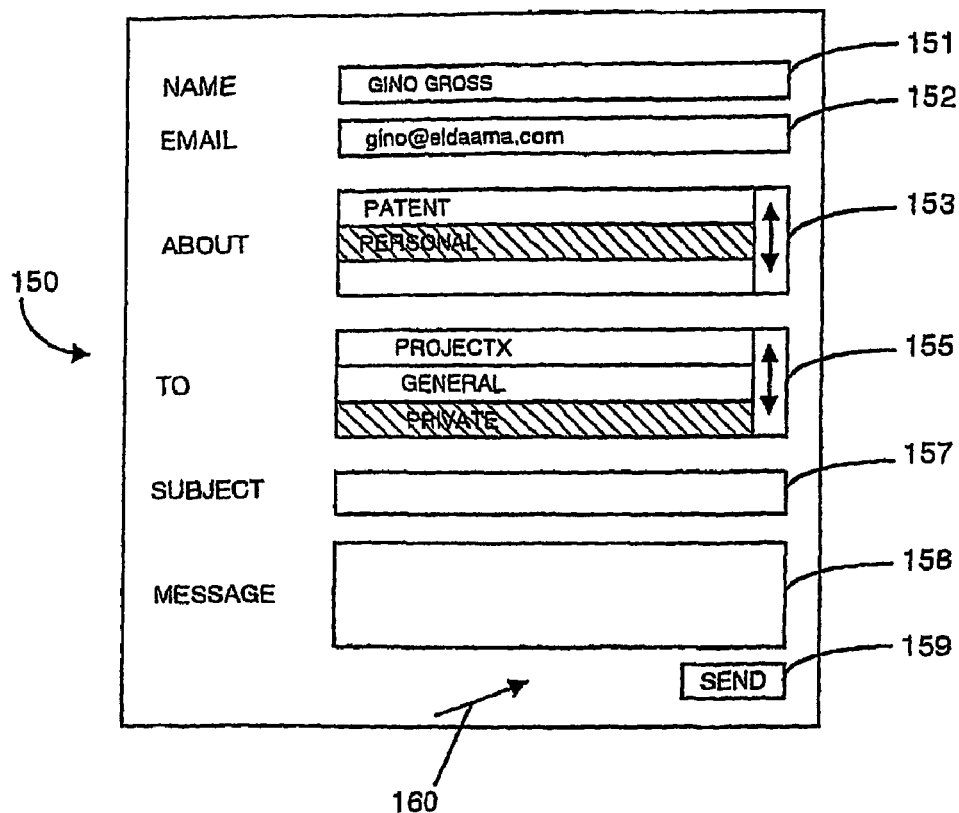
FIG. 10 is an illustration of an exemplary user interface for inputting data for dispatch as a message, in accordance with the present invention.

FIG. 10 is an illustration of an exemplary user interface 150 generated by a message dispatched module 26. In this embodiment, the user interface 150 includes: a name entry window 151; an e-mail address window 152; an about window 153; a to window 155; a subject header window 157; a message entry window 158; a send button 159; and a pointer 160.

After a user interface 150 has been displayed to the user the message dispatch module 26 waits (S31) until text data is inputted using a keyboard. This text is then displayed in the name entry window 151. The message dispatch module 26 then (S32) determines whether the text displayed in the name entry window 151 corresponds to contact name data 42 for any contact record 40 stored within memory 10. If this is the case the message dispatch module 26 then retrieves the contact record 40 including the contact name 42 and causes to be displayed within the e-mail window 152 the e-mail address 44 of the retrieved contact record 40. The message dispatch module 26 also causes to be displayed in the about window 153 a list of name tags 34 corresponding to name tags 34 of handling records 30 having record numbers 31 within the permitted list 46 of the retrieved record. The message dispatch module 26 also causes to be displayed within the to window 155 name tags 34 corresponding to name tags 34 of handling records 30 and in record numbers 31 within the available list 48 of the contact record 40 retrieved from memory 10.

Utilizing the pointer 160 under the control of a mouse or other input device, a user can then make a selection from the displayed name tags 34, the subject window, message window 157, 158 and the send button 159. If a name tag 34 is selected, the message dispatch module 26 causes the selected name tag 34 to be highlighted. If a window is then selected, the message dispatch module 26 causes any text entered by the user utilizing a keyboard to appear as text within the selected window 151-158.

After text data has been displayed within the e-mail window 152, the about window 153 and the to window 155 the message dispatch module 26 then (S33) waits until text has been entered into the subject window 157 and the message window 158 and at least one name tag 34 has been selected from the name tags 34 displayed within the about 153 and to 155 windows and the send button 159 has been selected by the user.

When the message dispatch module 26 determines that the send button 159 has been selected by the user utilizing the pointer 160 under the control of the mouse or another input device. The message dispatch module 26 then generates (S34) a message for dispatch from the text and selection entered utilizing the user interface 150.

Figure 11:
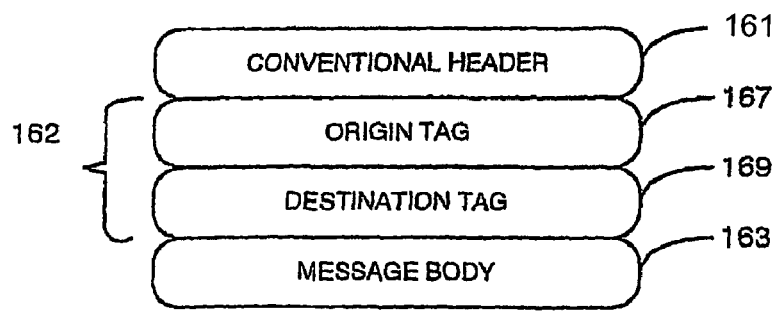
FIG. 11 is a schematic block diagram of the data structure of a generated message, in accordance with the present invention.

FIG. 11 is a schematic block diagram of the data structure of a message generated by the message dispatch module 26 in accordance with this embodiment of the present invention. The message generated by the message dispatch module 26 comprises a conventional SMTP (Simple-mail Transfer Protocol) message including an extended message header. Specifically, the message comprises a conventional header 161 including data identifying the e-mail address 44 displayed within the e-mail window 152 of the user interface 150 and a subject header including the text displayed within the subject window 157 of the user interface 150; an extended header 162; and a message body 163 comprising of text entered within the message window 158 of the user interface 150.

In this embodiment, the extended header 162 comprises an origin tag 167 comprising a list of name tags 34 and tag data 32 of handling records 30 including name tags 34 selected from within the about window 153; and destination tag 169 comprising tag data 32 and name tags 34 of handling records 30 including name tags 34 selected from within the to window 155.

By presenting a user with a list of name tags 34 provided by an intended recipient of a message within the to window 155, a means is provided to prompt the user to select appropriate categories assigned by the recipient to be associated with the message. Alternatively, when a reply to an e-mail message is made the name tags 34 and tag data 32 associated with an original message could automatically be selected for inclusion. Specifically, when replying to a message the name tags 34 and tag data 32 in a reply would be reordered with the origin tag 167 from an original message becoming the destination tag 169 for a reply and the destination tag 169 from an original message becoming the origin tag 167 in a reply.

When the message dispatch module 26 has generated a message including an extended header 162 the message dispatch module 26 then (S36) processes the generated message in accordance with the processes identified by the function lists 36 and store identification data 38 of handling records 30 whose name tag 34 and tag data 32 is included within the extended header 162 of the generated message.

Specifically for each of the functions on the function list 30 of records having name tags 34 and tag data 32 corresponding to name tags and tag data 32 included with the extended header 162, the message dispatch module 26 initially determines whether the process corresponding to the function is a function to be performed before or after dispatch of a message. If the function is a function to be performed before dispatch the message dispatch module 26 causes the function to be performed.

After all of the functions corresponding to functions to be performed prior to dispatch have been performed the message dispatch module 26 then causes the message to be sent via the Internet 5 to the computer identified by the e-mail address 44 included in the conventional header 161 of the generated message and the processing of the message dispatch module 26 comes to an end.

Figure 12:
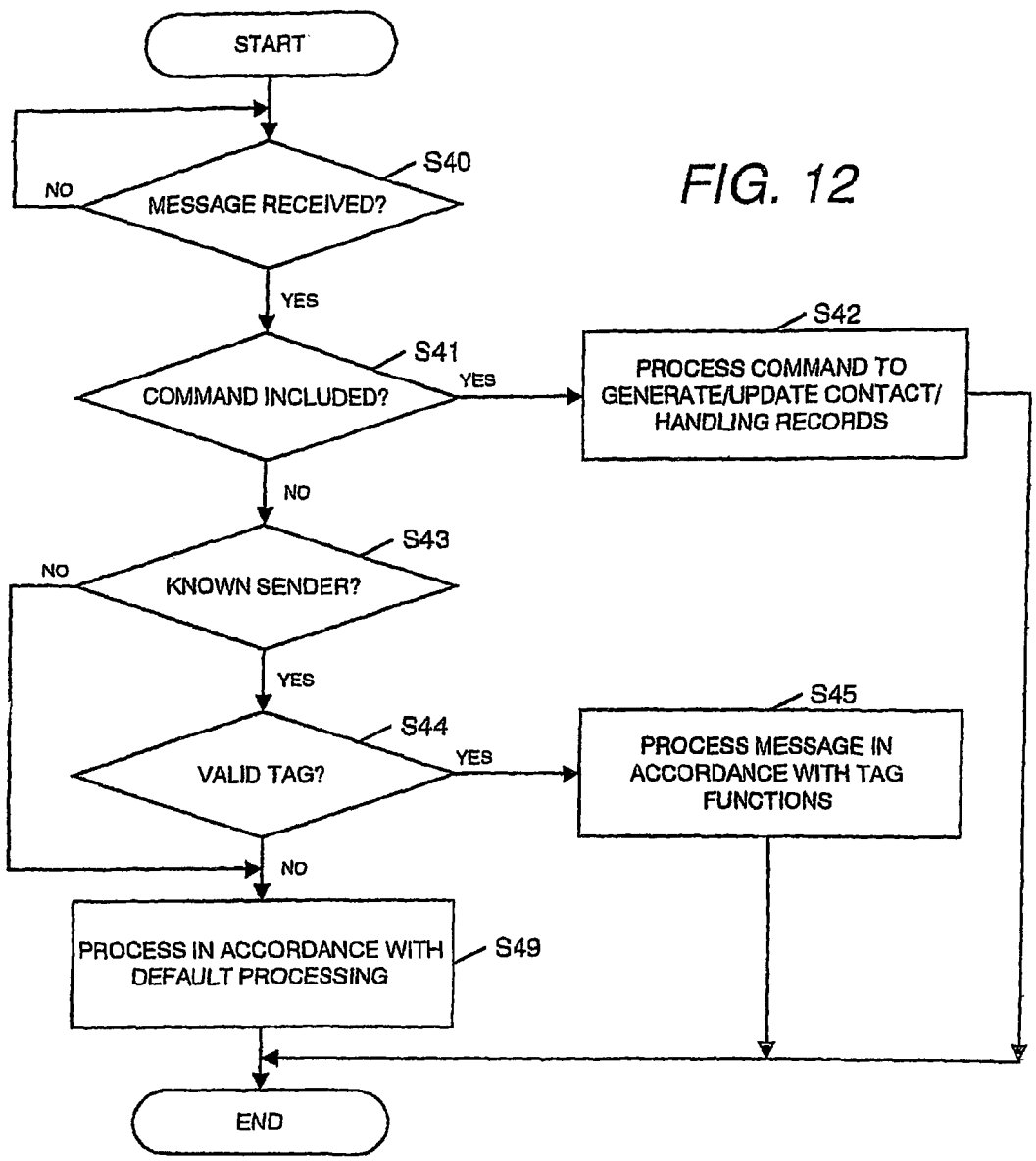
FIG. 12 is a flow diagram of the processing of a message receipt module, in accordance with the present invention.

The processing of a message receipt module 28 of a message handling program 16 will now be described with reference to FIG. 12 which is a flow diagram of the processing of a message receipt module 28.

Initially (S40), the message receipt module 28 waits (S40) until a message is received from the Internet 5. When a message is received from the Internet 5 the message receipt module 28 then (S41) determines whether the message includes command data. In this embodiment whenever a message is dispatched from a computer including a system set up program 14 as a result of the amendment of contact data 20 or handling data 18, this causes the computer to dispatch via the Internet 5 a message incorporating command data identifying a corresponding amendment to be made to contact data 20 or handling data 18 on other computers as has been described earlier. When the message receipt module 28 of the other computer receives such a message and determines that command data is included within such a message the message receipt module 28 then (S42) proceeds to process the command to cause the computer to update handling data 18 and contact data 20 stored within the memory of the receiving computer.

Specifically, where the message receipt module 28 determines that a message received from the Internet 5 includes command data identifying a command to update a contact record 40, the message receipt module 28 initially determines whether the memory 10 of the computer receiving the message has stored within it a contact record 40 having an e-mail address 44 corresponding to the e-mail address from which the message to update contact data 20 has been received.

If the message receipt module 28 determines no such record exists, the message receipt module 28 then proceeds to generate a new contact record 40 including as e-mail address data 44, the address from which a message has been received. The message receipt module 28 then proceeds for each partial handling record 30 including a filtered function list 36 and store identification data 38 received as part of an update instruction to determine whether the computer has stored in its memory a handling record 30 including tag data 32 corresponding to the tag data 32 of each of the received handling records 30. Whenever the message receipt module 28 determines that such a record is not stored in memory 10, the message receipt module 28 causes a new handling record 30 to be generated comprising the next available record number 31 and tag data 32, a name tag 34, function list data 36 and store identification data 38 corresponding to the partial handling record 30 under consideration. This new record 30 therefore comprises data identifying a set of functions to be performed prior to dispatch of a message associated with the tag data 32 of the record 30.

The message receipt module 28 then causes the available list 48 of the contact record 40 including the e-mail address 44 from which a message has been received to comprise a list of record numbers 31 of handling records 30 including tag data 32 corresponding to tag data 32 of the handling records 30 in the received message.

Thus, in this way by the permission management module 24 of the system set up program 14 of one computer dispatching an instruction to update contact and handling records 40, 30 the message receipt module 28 of a computer identified by the e-mail address of an updated contact record 40 is caused to include in its memory 10 a contact record 40 having an available list 48 identifying handling records 30 including tag data 32 and a name tag 34, identical to the corresponding data of handling records 30 identified by the permitted list 46 of the amended contact record 40 associated with that e-mail address. However, in contrast to the function list data 36 and store identification data 38 of the handling records 30 of the dispatching computer 1, 2 which include data identifying processes to be performed both prior to and subsequent to dispatch in this embodiment the records 30 generated by the message receipt module comprise filtered records which only include data relating to processes to be performed prior to dispatch.

When the message receipt module 28 receives a message including command data identifying that a handling record 30 has been deleted, this causes the message receipt module 28 to delete from the handling data 18 stored in memory 10 a handling record 30 including tag data 30 incorporated within the received command. The message receipt module 28 then proceeds to amend the available lists 48 of contact records 40 including references to record numbers 31 of the deleted handling record 30 to remove references to the record number 31 of the deleted record from those lists.

Where the message receipt module 28 receives a message incorporating command data identifying a command to amend handling data 18 corresponding to an amendment to a handling record 30. The message receipt module 28 causes the handling record 30 stored in its memory 10 including tag data 32 corresponding to tag data included within the received command data to be amended so that the name tag 34 function list data 36 and the store identification data 38 of the amended record corresponds to name data 34 function list data 36 and a store identification data 38 included within the command data of the message received from the Internet 5.

Thus, in this way when amendments are made to handling data 18 and contact data 20 on one computer corresponding amendments are made to handling data 18 and contact data 20 in other computers. However, for each of the computers 1, 2 the available list 48 of each contact record 40 stored within the computer's memory 10 is only amended by virtue of an action utilizing the computer 1, 2 identified by the e-mail address 44 included within the contact record 40 including that available list 48. Thus in this way each user is able to control the content of available lists 48 associated with the user's e-mail addresses 44 and thus limit the possible functions that are performed upon a message received from other computers.

After necessary updates to handling and contact data 18, 20 have been made following receipt of a message including command data the processing of the message receipt module 28 ends.

If the message received from the Internet 5 does not include command data the message receipt module 28 then (S43) determines whether the origin e-mail address contained within the conventional header 161 of the message corresponds to an e-mail address 44 of a contact record 40 stored within memory 10. If this is the case the message receipt module 28 then (S44) determines whether the origin tags 167 and destination tags 169 included in the extended header 162 of the received message corresponds to tag data 32 of handling records 30 having record numbers 31 included in the permitted list 46 associated with the identified origin e-mail address. If this is the case the message dispatch module 28 then proceeds to process (S45) the received message in accordance with the functions identified by the handling records 30 including the tag data 32 where the functions identified within the function list 36 correspond to functions to be performed upon receipt of a message. After these functions have been performed the processing of the message receipt system ends.

If the message receipt module 28 determines (S44) that the destination tag 169 included within the extended header 162 of the message received from the Internet 5 does not correspond to tag data 32 of a handling record 30 having a record number 31 within the permitted list 46, this indicates that the received message was dispatched in the time between an up date of handling data 18 or contact data 20 occurring on the recipient computer prior to receipt by the dispatching computer of the message. In such case in this embodiment or if the e-mail address from which the message has been received is determined (S43) not to correspond to an e-mail address 44 of a contact record 40, the message receipt module 28 performs (S49) default processing upon the received message storing the message in a pre-selected directory in a manner of a conventional e-mail program. The processing of the message receipt module 28 then comes to an end.

Second Embodiment

Figure 13:
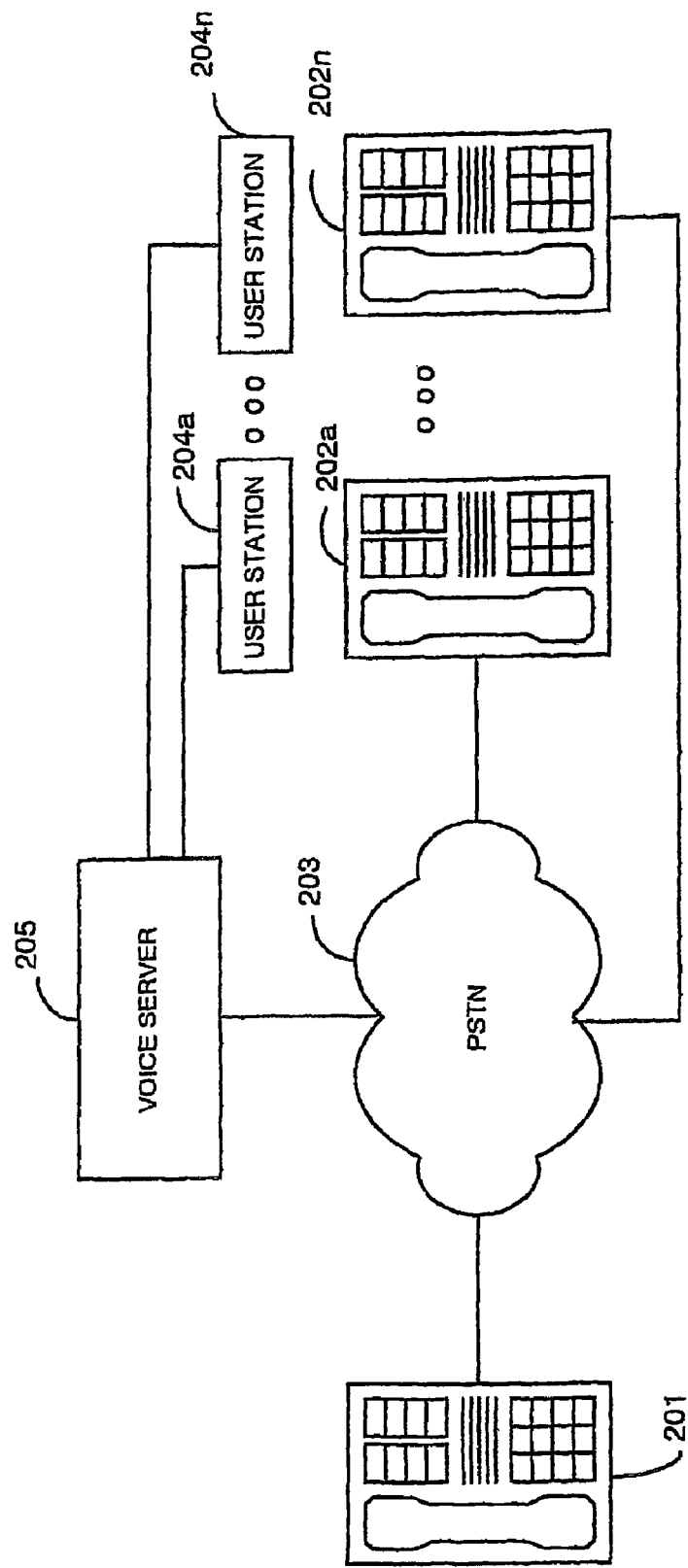
FIG. 13 is a schematic block diagram of a second embodiment of the present invention, in accordance with the present invention.

In the first embodiment, a system, computer product and method was described characterized by a communication system for sending email messages. A further embodiment is now described with reference to FIG. 13, in which the present invention, for illustration purposes, is applied to voice messages.

In accordance with this embodiment, there are provided a number of telephones 201, 202a-202n that are connected to one and another via a public switching telephone network (PSTN) 203. Associated with some of the telephones 202a-202n are user stations 204a-204n. The user stations 204a-204n are all connected to a voice server 205 that is also connected to the public switching telephone network 203, in a manner that is well known.

In accordance with this embodiment of the present invention, the user stations 204a-204n are arranged to enable individuals to generate records associating category data with functions to be performed on voice messages. The user stations 204a-204n are also arranged to enable users to associate items of category data with telephone numbers and their own phone number. These associations are stored in a manner similar to that in which contact data and handling data 18, 20 have been described to be stored in relation to the first embodiment. In accordance with the second embodiment, this data is stored on the voice server 205.

When an individual using a telephone 201 attempts to contact one of the telephones 202a-202n associated with a user station 204a, initially a connection is attempted to be completed to the telephone 202a, 202n. If a call is not answered, a connection is then made to the voice server 205. When a connection is made between a telephone 201, 202a, 202n and the voice server 205, the voice server 205 initially, identifies the telephone number of the calling telephone and the telephone number of the telephone to which a call was being made. The voice server then outputs to the telephone 201, 202, 202n making the call a menu to select from category data within a stored record including the destination and origin telephone numbers. When a selection is made using the telephone from the category data presented, a voice message is then recorded by the voice server 205 and then processed in accordance with the processes associated with the category selected.

As in the case of the first embodiment, by inputting data associating categories with functions to be performed, and associating groups of categories with origin and destination telephone numbers, a means is provided by which receivers of messages can identify a selection of functions which they wish to perform upon a recorded message received from specified callers.

Thus, for example users might indicate that a message is to be forwarded to another telephone or converted into a text message and forwarded to a pager or an email address or stored in a specified location for later retrieval. By associating groups of categories with origin telephone numbers, a user can then make certain choices as to the processing available to identified callers, thus controlling the processing of messages, including voice messages.

In this particular embodiment of the present invention, when the callers attempt to contact a specified telephone and this is not possible, the callers are then prompted to select from a prescribed set of categories associated with the origin telephone number. Once a selection has been made, a voice message is processed in accordance with the processes associated with the selected category.

Thus, in this way a receiver of a message is in control as to the processes that may be performed in regard to messages received from one or more specified locations or communication devices, whilst the selection between the prescribed set of categories by the caller enables different messages from the same location to be identified for different types of processing but without the need for the receiver of a message to review the content of the message prior to processing.

Third Embodiment

Figure 14:
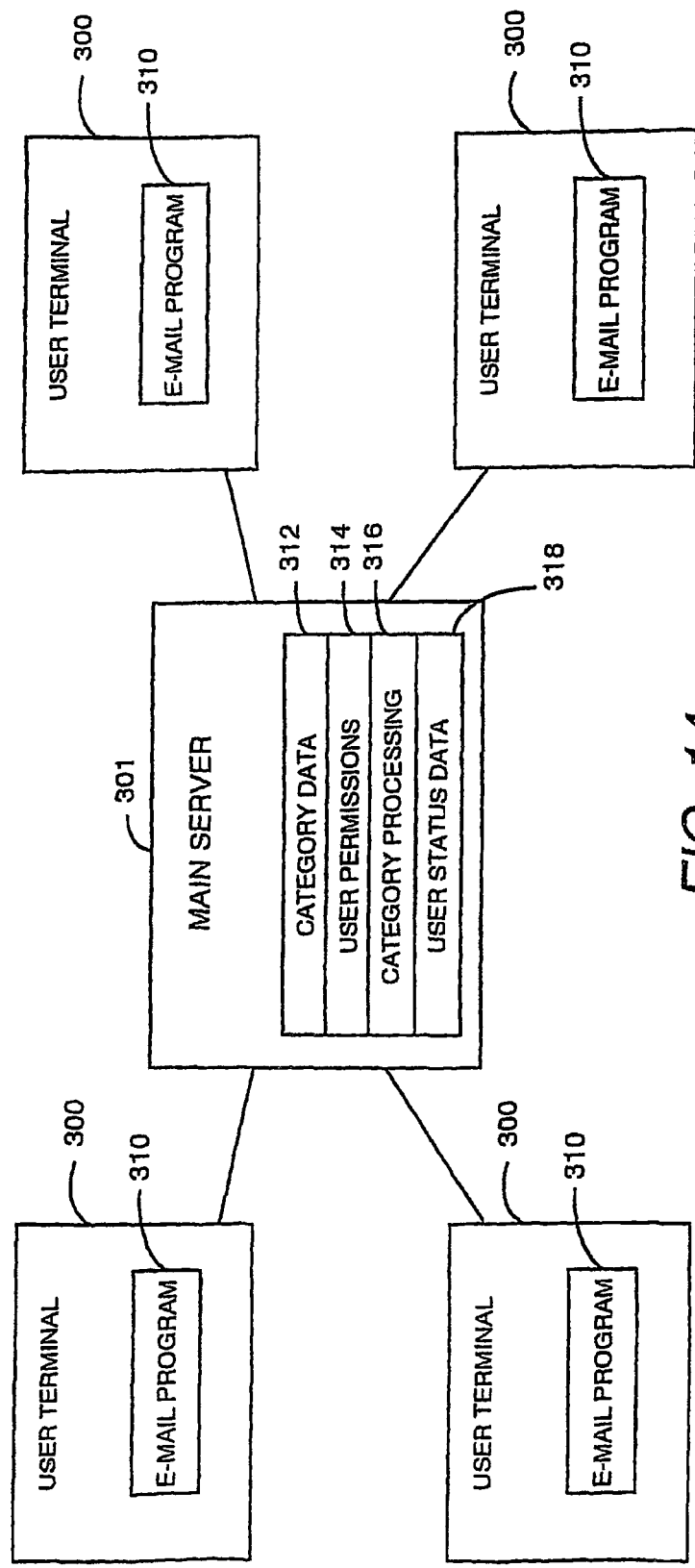
FIG. 14 is a schematic block diagram of a third embodiment of the present invention.

A third embodiment of the present invention will now be described with reference to FIG. 14. FIG. 14 illustrates a schematic block diagram of a computer network in accordance with this embodiment.

In this third embodiment of the present invention, a computer network (not specifically enumerated) comprises a plurality of user terminals 300 each connected to a main server 301. Each of the user terminals 300 have stored within its memory an email program 310 for generating and dispatching email messages and for accessing data stored on the main server 301. Stored on the main server 301 is category data 312 identifying possible categories which may be associated with messages; user permissions 314 being lists of user terminals 300 associated with each item of category data 312; category processing sub-routines 316 being a set of sub-routines each associated with an item of category data, the sub-routines defining how a message associated with a specific item of category data 312 is to be processed. Specifically, in this embodiment, the category processing sub-routines 316 comprise sub-routines for storing messages in specific locations and forwarding messages to selected groups of user terminals 300. All of the data stored on the server 301 is generated in a conventional manner utilizing a known system administration program (not shown). Also stored in the memory of the main server 301, is user status data 318 identifying the current user status for individual user terminals 300 as is described in detail later.

In this particular embodiment of the present invention, as the category data 312, user permission data 314 and category processing routines 316 are all stored centrally on the main server 301, the need for transmitting records between user terminals 300 is avoided. When a user wishes to transmit a message the email program 310 stored on the user's user terminal 300 initially accesses the main server 301 to obtain category data 312 associated with that terminal via the user permission data 314. A user may then select from the received items of category data to associate with a message that is generated using the email program 310. When a message is transmitted from the user terminal 300, it is received by the main server 301 which processes the received message in accordance with the sub-routine defined by the category processing sub-routines 316 associated with category data included in the message, by forwarding messages to selected groups of user terminals 300 selected utilizing the category data included within a message.

In addition to enabling users to generate and send e-mail messages, the email program 310 in this embodiment also prompts a user to input user status data whilst an email program is active. This is then forwarded to the main server 301 where it is stored as user status data 318 on the main server 301. By providing category processing sub-routines 316 which either forward messages onto selected user terminals 300 or hold copies of messages for later retrieval on the main server 301 depending upon the user status data 318 associated with a destination address for a message the category processing sub-routines 316 and user status data 318 provide a means by which users can control the timing of which messages are forwarded onto them. Thus, for example, by selecting a user status indicating work had been progressed on a specific project message relating to other projects could be delayed and to avoid the user being disturbed by the receipt of new messages.

Additionally, although in this embodiment user permissions 314 are determined centrally by a systems administrator utilizing an administration program (not shown), further means could be provided to enable users to add or remove themselves from lists of selected groups of terminals associated with sub-routines for forwarding messages associated with a particular item of category data. This would provide additional means by which users could control their receipt of messages.

Fourth Embodiment

A fourth embodiment of the present invention will now be described with reference to FIGS. 15, 16 and 17 which represent schematic block diagrams of a computer network in accordance with this embodiment as well as FIGS. 3 and 4.

Figure 15:
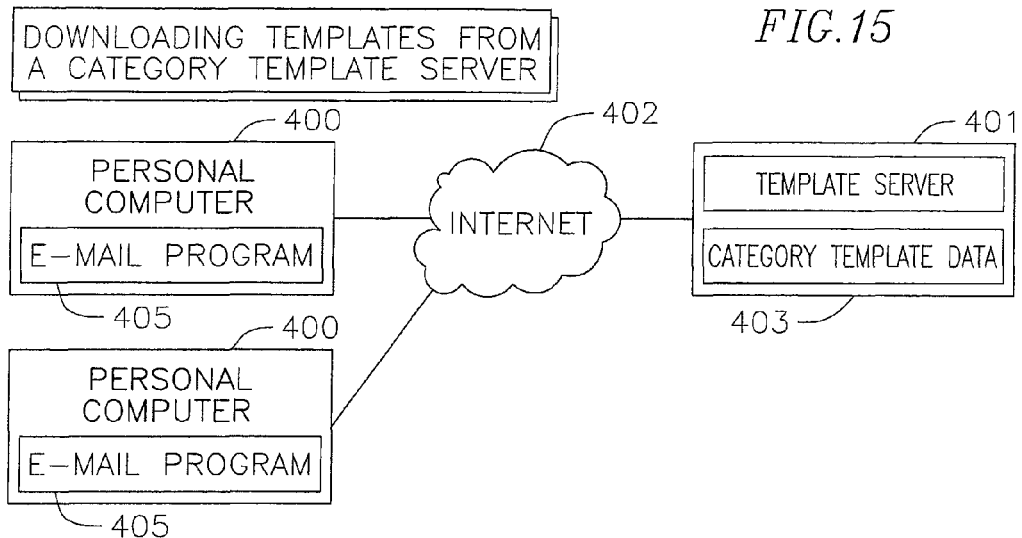
FIG. 15 is a schematic block diagram in accordance with a fourth embodiment of the present invention.

With reference to FIG. 15, a plurality of personal computers 400 is shown each including a modified email program 405 within its memory, and each of the personal computers 400 being connected to the Internet 402. Also shown, is a Template Server 401 for storing category template data 403 within its memory.

Figure 16:
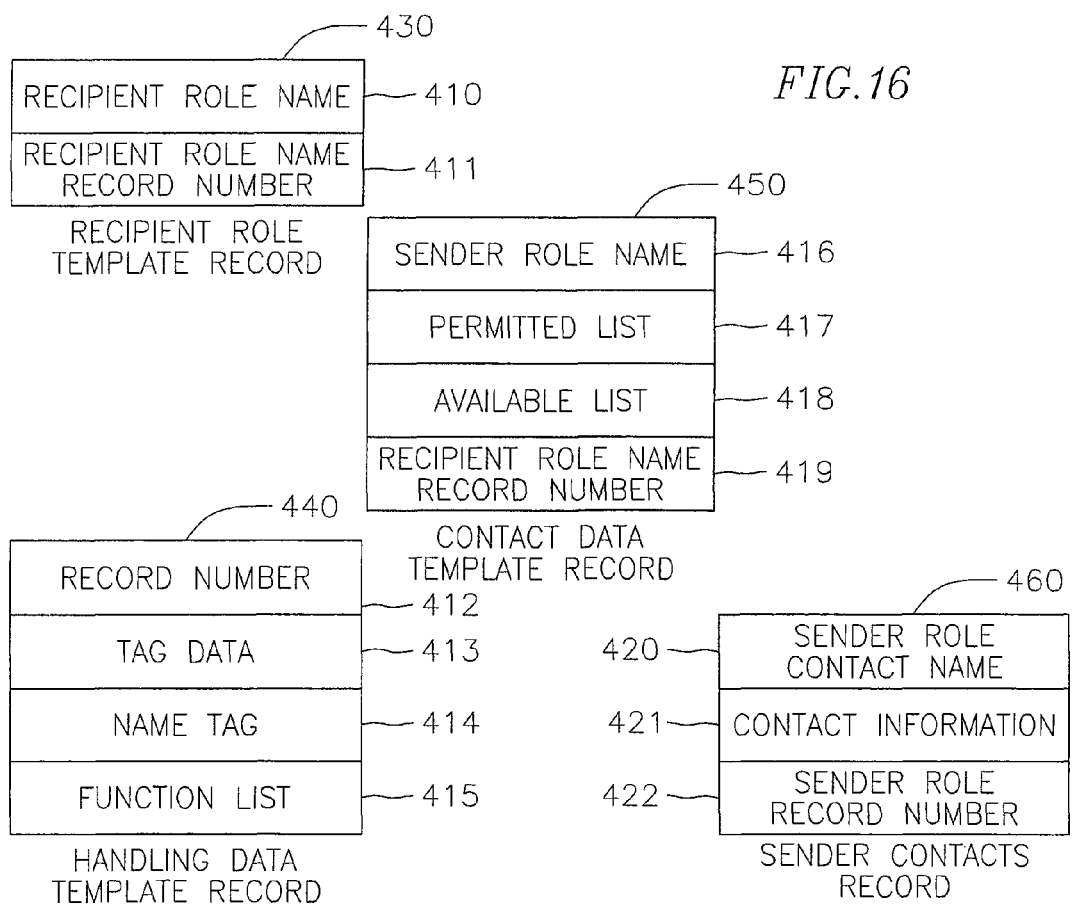
FIG. 16 is a schematic block diagram of data stored within the memory of a computer, in accordance with the fourth embodiment of the present invention.
Figure 17:
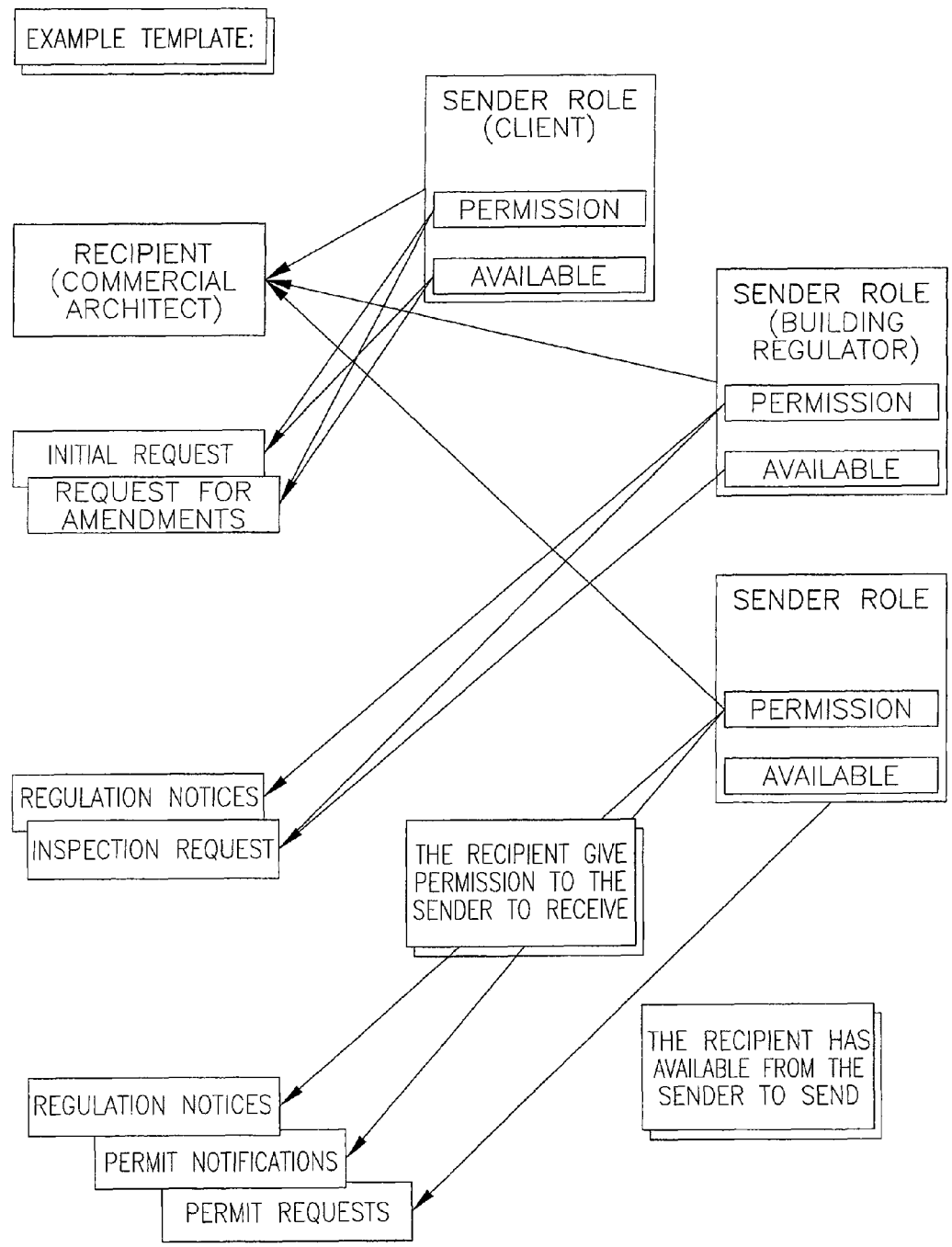
FIG. 17 is a schematic block diagram of data and processing criteria stored within a particular template, in accordance with the fourth embodiment of the present invention.

FIG. 16 illustrates possible contents of category template data 403 stored within the memory of the Template Server 401. Category template data 403 is comprised of a plurality of recipient role template records 430, a plurality of handling data template records 440, a plurality of contact data template records 450, and a plurality of sender contact records 460.

Each recipient role template record is associated with a plurality of contact data template records 450, thereby defining one or more sender roles 416 and recipient roles 410. Each Contact data template record 450 identifying one sender role 416 is then associated with a plurality of handling data template records 440. Handling data template records 440 includes a permitted list and the available list within the contact data template record 450. Furthermore, each contact data template record 450 is associated with a plurality of sender contact records 460 which associate sender contacts with sender roles 416.

In this embodiment, a user of a modified program 405 can access one or more Template Servers 401 on the Internet 402, and search within the category template data 403 for a recipient role name that identifies the role the user wishes to play in communicating with other defined users, including in some cases in particular circumstances. For example, a user could identify that the Recipient role name Commercial Architect stored within the Template Servers 401 Category template data 403 describes his/her communication tasks he/she wishes to perform.

When the user selects a Recipient role name, a set of associated Sender roles together with corresponding permission and applicable categories are made available to the user, for example by downloading and installation of same to the user's modified email program 405.

Once such data is made available to the users, the present invention provides means for the user associating his/her contact data with one or more sender roles stored in the contact data template record 450, which in turn includes the corresponding categories in the permission lists stored in the contact data template record 450, in the permission list for those contacts in the recipient's modified email program 405. In addition, all corresponding categories in the available list stored in the contact data template record 450 would be included in the recipient's available list for those contacts.

Both the recipient and his/her contacts may be associated with more than one role, and categories may be managed in relation to their associated roles. For example, a recipient can choose to delete all categories of a contact that are associated with a certain role, or to move all categories from one contact to another corresponding to the moving of a role from one contact to another.

Some roles, in the present example of the Commercial Architect provided for illustration purposes only, may be conditional such as when dealing with certain size of area, or type of building. Such conditions could be displayed when the recipient prior to the associating of the downloaded roles to corresponding contacts.

The user can also choose to download sender contact data records 460 from the Template Server 401 that are associated with each contact data template record 450 to include in his/her contact list. Contact data template record 450 may further include a sender role contact list 451 such that each record in the contact data template record 450 includes a sender role contact record number 422. In this way, the user can find new contacts that he would need to communicate with. Alternatively, alternative contacts can be suggested.

When a template is downloaded, a notification can optionally be sent from the Template Server 401 to some or all associated contacts. Such notification could notify associated contacts that a Recipient has shown interest in their roles and might want to have information sent to him/her.

Alternatively, the recipient could also request such notifications explicitly. In such a case a recipient might choose to notify only a subset of the sender. Such a notification could also include additional information on the particular needs of the recipient in relation, for example, the particular expertise provided by the senders.

Such senders who have been notified that a recipient has downloaded a contact data template record 450, with which they are associated, can then from time to time, send additional information to the recipient such as additional offers, advertisements (sometimes called "permission marketing").

When templates are modified on the Template Server 401, for example, by adding new roles or by including new contacts within roles, recipients who have downloaded such templates could be notified, to update their downloaded templates accordingly.

Alternatively, recipients who have downloaded templates may suggest additional roles and/or contacts to be added. Such additions, when granted by the Template Server 401 providers, could then be included in existing templates or be added as new modified templates.

Specifically in relation to the operation of this fourth embodiment, the following example is provided for illustration purposes only. With reference to FIG. 17, a recipient having the role of a commercial architect can download typical roles of senders, and associate their respective categories to his/her contacts. For example, a commercial architect may communicate among others with a Client, Building Regulator, and a City planner, as shown in the contact data template in FIG. 17.

Once a template is retrieved from the Template Server 401, the recipient can include the categories provided in the template in his/her permitted and available lists, and include handling template data in his/her handling data list.

The recipient associates his/her contacts with the roles names provided by the contact data template 450. Once the recipient contacts are associated with sender roles, the corresponding categories in the contact data template 450 become permitted categories for those contacts. The usual process of sending such permitted categories to those contacts can then be invoked.

The recipient may not have contacts for all the proposed sender roles. This may occur when in the particular project the recipient is involved in, not all proposed template roles are needed.

It may also be the case that the recipient was not aware of the need to include additional contacts. The contact template record 450 therefore suggests the need for another role that should/could be included as a stakeholder in the project. For such cases, or for example, when the recipient wishes to evaluate alternative professional contacts, the contact data template record 450 provides lists of potential candidate contacts, and contact information (geographic area, fee's, homepages etc.).

Professionals can register with the providers of Template Server 401 to associated with role names. This may involve a fee.

Fifth Embodiment

Figure 18:
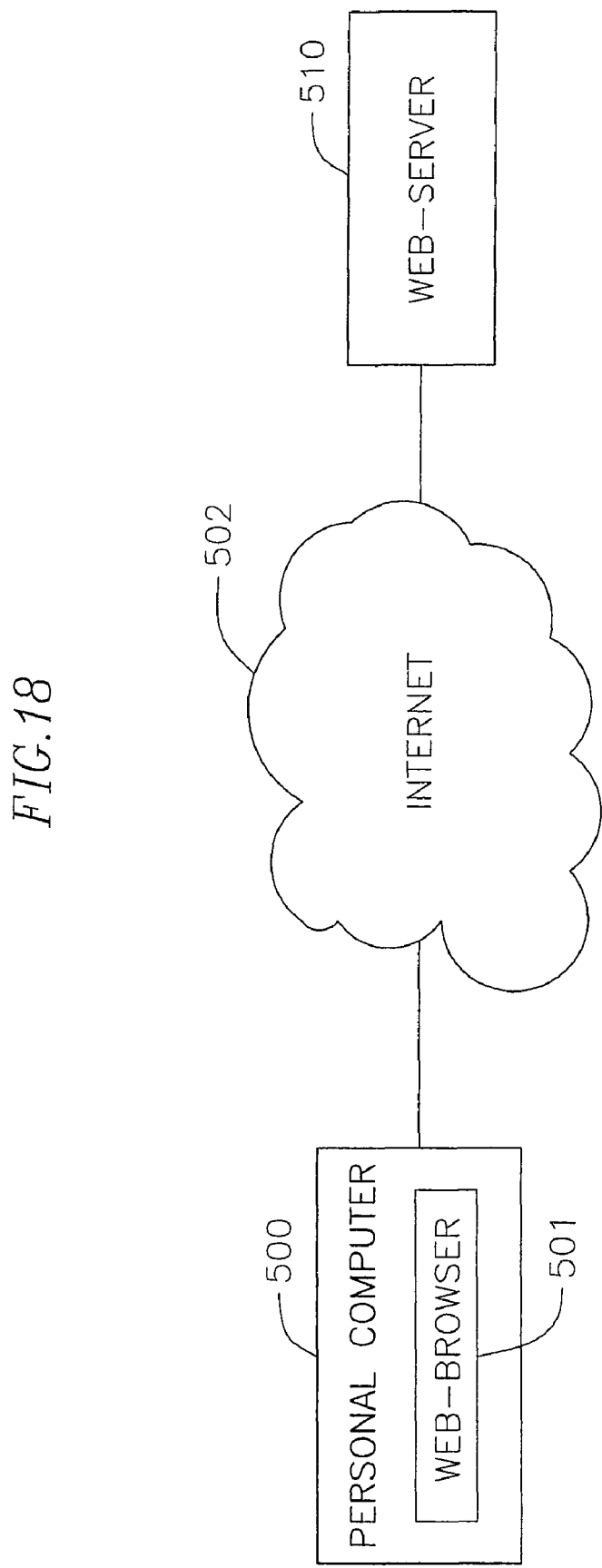
FIG. 18 is a schematic block diagram of the system of the present invention in accordance with a fifth embodiment of the present invention.

A fifth embodiment of the present invention will now be described with reference to FIG. 18 which is a schematic block diagram of a computer network in accordance with this embodiment. The fifth embodiment comprises a Personal Computer 500, and a modified web-browser 501 operated within the memory of the personal computer 500. The modified web-browser 501 can transmit category data preselected by web-browser users to the web-server 510. The Web-server is provided with web serving software (not shown) that can receive and send categories and data in accordance with this invention. The personal computer 500 and the web-server are both connected to the Internet 502.

Figure 19:
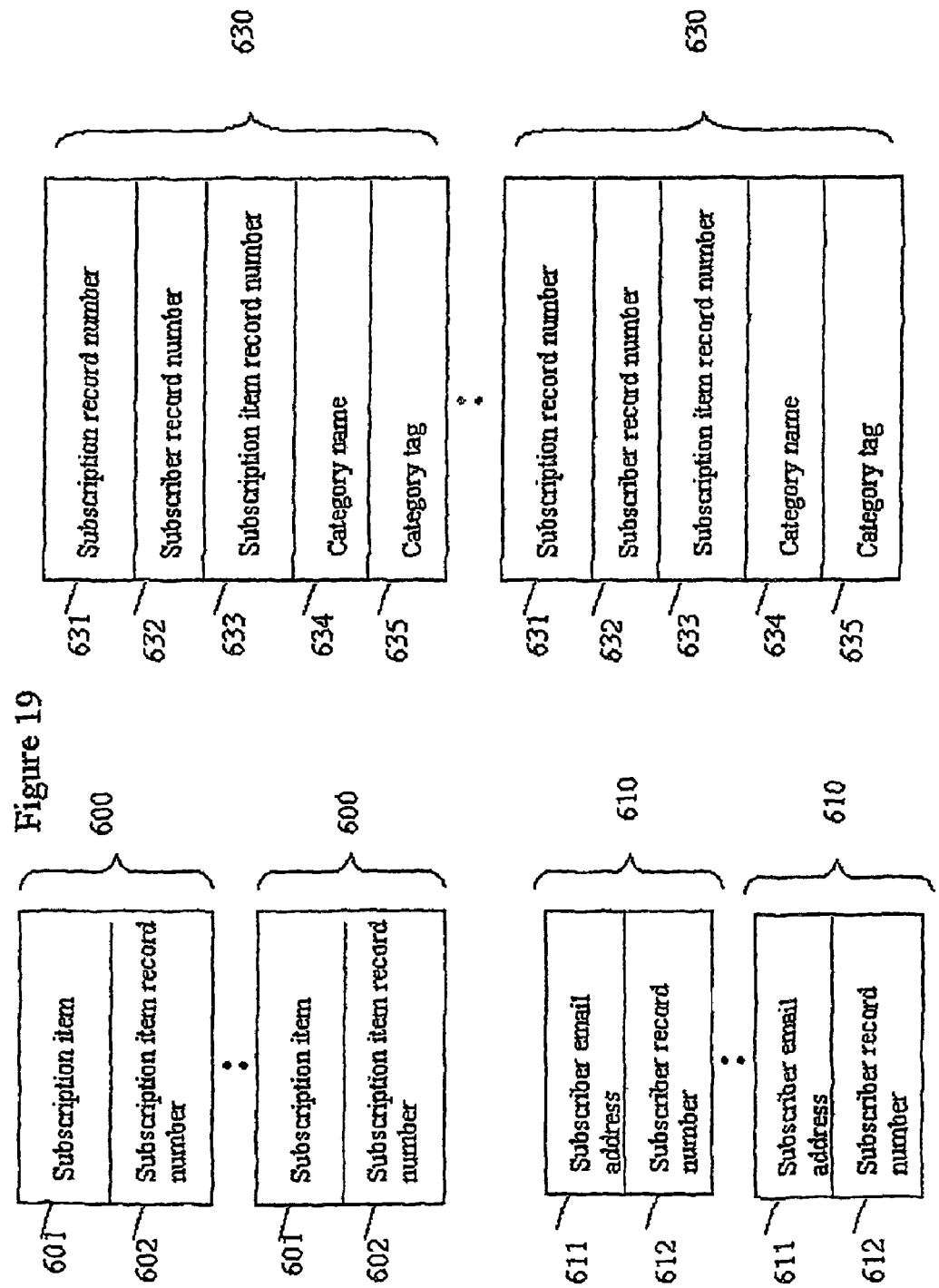
FIG. 19 is a further schematic block diagram of data stored in a computer in accordance with the fifth embodiment of the present invention.

With reference to FIG. 19, stored on the web-server are subscribable items' records 600, subscriber information records 610, and subscription information records 630.

Subscribable items' records are comprised of a subscription item 601 referring to a subscription resource on the web-server 501, and a subscription item record number 602 identifying a subscribable item record 600. Subscriber information records 610 are comprised of the subscriber's email address 611 and a subscriber record number 612 identifying a subscriber record. Subscription information records 630 are comprised of subscription record number 631 identifying a subscription information record, a subscriber record number 632 identifying a subscriber, a subscription item record number 633 identifying a subscribable resource, category tag 635 identifying the tag data associated with the subscription item, and a category name 634 a user readable name associated with the category tag 635.

In this particular embodiment of the invention a subscriber using a modified web-browser 501 selects a subscribable item represented on a web-page (not shown) displayed by web server 501 in a manner that is known. Once a subscribable item is selected, preselected tag data is associated with this selection and transmitted, together with other subscriber information to the web-server application described. The tag data described is provided in a manner that is known, as described in this description, for example, in relation to the first embodiment.

The web-server application after receiving the subscription request together with the subscriber's email address and category data associated with the subscription request, checks if the subscriber's email address is already stored with the subscribers records on the web-server. If the subscriber already exists, the subscriber's existing subscriber record number 612 is noted for further processing, otherwise a new subscriber information record 612 is generated including a new subscriber record number 612 as well as the subscriber's email address 611.

The web-server application then generates a subscription information record 640 including a new subscription record number 631, the found subscriber record number that identifies an already existing subscriber or the newly created subscriber record number 632 identifying a new subscriber, the subscription item record number identifying the resource being subscribed to, and the category tag 635 and category name 634 transmitted from the modified browser.

In this particular embodiment of the invention, the web server application described transmits resource data as emails to subscribers in accordance to subscription information stored in the subscription information records 630. This email data is then also associated with the category tag data 635 stored in the subscription information record 630 in accordance to the association of this resource data with the subscriber and the category tag 635 previously stored. Once the email is received by the subscriber, a known modified email program can then process the received email in accordance to the first embodiment of this invention.

Sixth Embodiment

Figure 20:
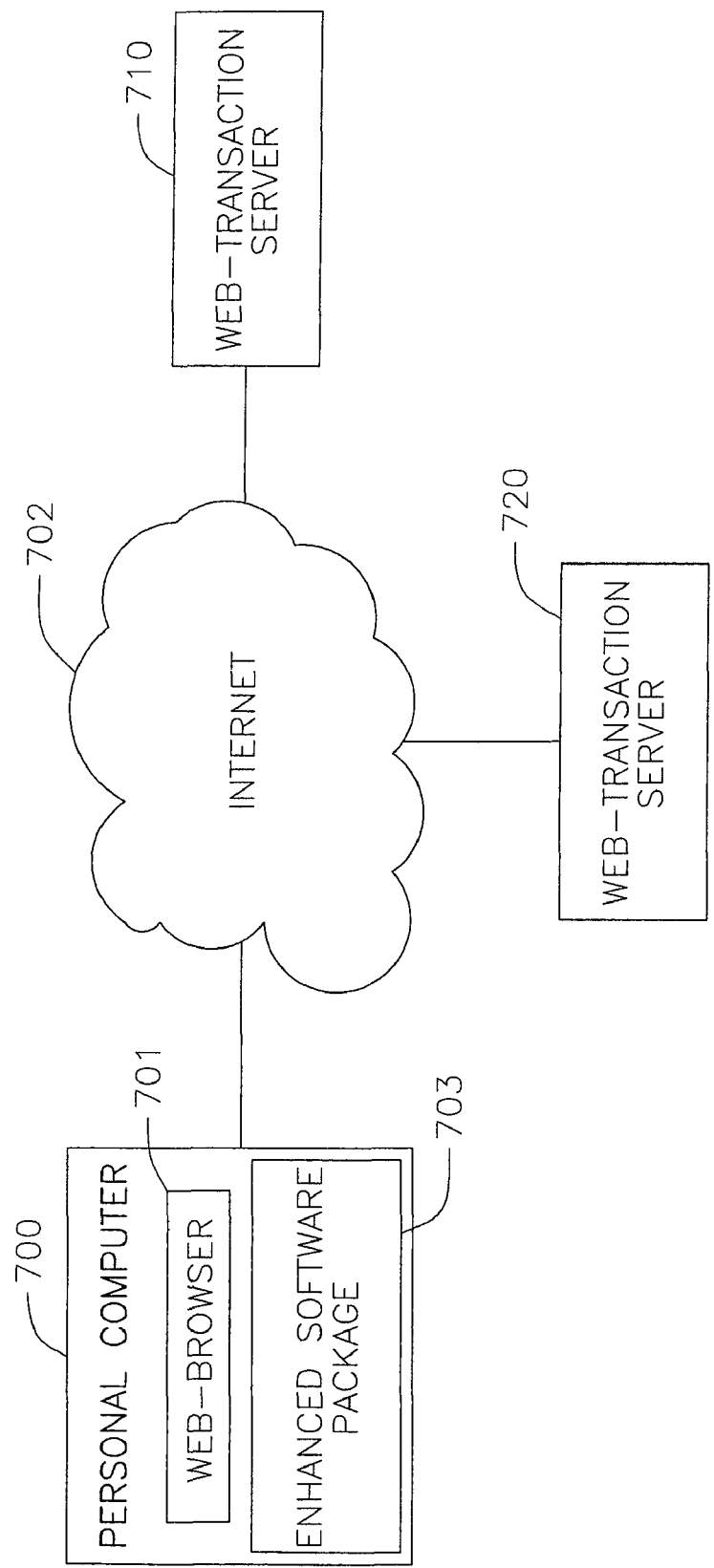
FIG. 20 is a schematic block diagram of the system of the present invention in accordance with a sixth embodiment of the present invention.

The sixth embodiment is illustrated in FIG. 20. This embodiment includes a personal computer 700, a modified web-browser software 701, modified web-servers 710 for providing online transaction processing services, modified transaction database servers 720 for recording transactions within a transaction-database, and any modified software package 703 that can process data in accordance to predefined categories. The modified web-browser 701, the modified web-server 710, the modified transaction database server 720, and the modified software package 703 are all connected to the Internet 702.

Furthermore, users could also use parameterized categories (as further explained below), which may obtain their final value at a later point in time after having been associated with transaction data. For example, a user may associate a transaction with a category of "Household Expense", and a parameterized sequence number with a default sequence number of 1. Other categories would also be categorized with a parameterized sequence number and default value. When no further user intervention happens, then the default sequence numbers would determine the order of categorized transactions in a transaction report, in a particular illustration of this embodiment of the invention. However, prior to sorting the transaction data at the transaction data base server, the server software could check whether the user has assigned a different set of sequence numbers, which would yield a report order in an alternative manner.

In this embodiment of the invention, users preferably perform online transactions utilizing modified web-browsing software 701. Such modified web-browsing software allows categorizing of transaction data according to categories provided by the user. Transaction data which is processed by a modified web-transaction server 710 is associated with such categories and sent to modified transaction database servers 720.

When processing the transaction on the modified transaction database server, the user's predefined categories that are now associated with the users transactions, that are stored in the modified transaction database server, are used to sort and/or filter or to otherwise customize the transaction data during its processing. For example, transaction data can be sorted and categorized according to predefined user categories identifying different types of expenses and different users' client accounts, prior to the reporting the transaction data to the user. Alternatively transaction data can be sent to the user's modified software packages 703 which can then process the transaction data in accordance with the associated categories.

For example, a user, when performing a transaction on a web-based internet server using a credit card linked to the users bank account, can categorize such transaction based on his/her predefined categories. A paper bank statement later sent to the user can then be presented and customized according to the user predefined categories and customization definitions. Alternatively, a bank statement sent as a data transmission to the user's money management or tax management software can be processed by such modified software packages in accordance with the categories previously defined by its user. Such implementations of web-transaction processing servers and web-transaction database servers provide improved customization capabilities for users in regard to how specific transactions are processed by a 3rd party transaction processors, including by means of their remote transaction processing equipment.

When users utilize category data that are provided by a $3^{rd}$ party, such as a bank storing transaction data, such transactions could be analyzed by a $3^{rd}$ party and the results of such analysis could be forwarded to the user. For example, a bank could analyze the spending habits of their client, based on predefined categories. Advertising companies could utilize such categories to classify user transactions and send advertising information tailored to the user's needs. Alternatively, instead of performing transactions online with web-browsers, smart cards could be used that store users predefined categories. Such smart cards could then be used during shopping to categorize purchased items during check-out.

Example in Operation

The following example in operation relates to one or more of the embodiment of the invention described. It is provided to illustrate the advantages of the present invention.

Jim works on 4 projects within a large pharmaceutical research company. The company has set up 8 standard "categories" for each project. Emails are categorized accordingly as follows: For your information, Asking for Action, Scheduling, Make a call, Strategic Decisions, Related Research, Urgent, Other. Each project also has a separate "category" for voice messages. These "categories" are used by all team members when emails are sent. He also has some general company "categories" such as Expertise search, Press releases, New Staff, CEO Communications etc.

08:00. Still at home during breakfast: Only Scheduling Emails from work are copied/forwarded to his PDA. They are kept brief to fit on a small screen because by using Jim's scheduling "category", the sender is prompted with a "form" that makes the sender aware that his/her communication will appear on Jim's PDA. The form has preset areas for text which allow for a limited number of words only and which is configured by Jim. The form has also a preset area for Date/Time/Length enabling the email-scheduling-form to interact with Jim's PDA's Calendar function. Jim can drag and drop (or click to accept/reject) the new scheduling data into his electronic calendar. Alternatively the PDA can check whether the requested date, time and length of meeting is available in Jim's time schedules and inform Jim (or the sender) about his options.

08:30. In the car three Make-a-call-emails arrive on Jims mobile phone. Again senders using this particular "Make-a-call" "category" are prompted to keep it short to appear on Jim's mobile phone. They might again be restricted in the text-space Jim made available for make-a-call-email-forms. The email form includes a space for phone numbers which can be speed-dialed once the email reaches Jims mobile phone.

09:15. At work, time is tight and Jim hurries into a meeting on Project 2. Although Jim received 80 new emails on his PC/Laptop his inbox is clearly visually structured according to different kinds of emails. This enables Jim to quickly focus on "Asking-for-actions-emails" related to Project 2.

If time permits, he will also pay attention to "For-your-information emails" of that Project. By using Jims "Asking-for-Action" "category", the sender is prompted with a form that requires the sender to define by what date (or any other for of priority) the task needs to be performed. Once the message arrives at Jim's PC/Laptop at work it is copied to Jim's PDA where it gets processed into Jim's task manager. Reminders configured by Jim will draw his attention to the task.

09:35. During the first meeting Jim configures with a single click his mobile phone to accept calls only if related to this meeting (Project 2) and only if important. All other callers would leave voice messages. This was made possible because Jim configured his mobile phone to make available to different senders a variety of "categories" defined by specific projects and a priority for each project. Anyone calling his number will therefore be prompted with a list of choices to make before attempting to connect to Jim's mobile phone. A single phone call comes through and Jim is confident that the person calling is going to talk about a matter related to this Project and that it is an important issue.

14:00. Whilst in the previous meeting 16 voice messages were left. 5 are related to the next team meeting—Project 1. Jim can see on his mobile phone a list of all categories and the number of messages left in each category. With only limited time before his next meeting Jim can listen to only the specific voice mails that relate to that project. He does that on his laptop where the voice messages are stored in the corresponding voice mail folder (project 1). He erases but one voice message which he keeps on record for future needs.

The configuring of categories to appear on Jim's and his context's PCs, Laptops, mobile phones can be done by Jim on any of his devices and would be communicated to a server that would update all other devices.

14:30. During the meeting someone remembers that a similar project was completed 2 years ago. The team goes on the intranet and quickly retrieves all Strategic-decision-emails and Related-research-emails from the project completed 2 years ago which correspond to the stage the current project is in. They also retrieve who was working within that project and whether they are still within the organizations and in what role.

Each team has also many clients they communicate with. Different team members are allocated for different clients. Clients send message directly to the appropriate team member ("category") using only one email address of the organization. Some clients only reply to messages sent from the team member allocated to them. By replying, the message reaches the appropriate team member because messages are sent to the appropriate preselected return location as this also is information provided to a "category" of the present invention.

18:00. At the end of the day, Jim spends some time looking at For-your-Information-emails, and other organizational emails such as "Press releases" and "New Staff".

Also "Expertise-Search" emails from the central organization server, offering a opportunity of involvement in a sister company for someone with his expertise. This was made possible because Jim allocated one "category" to "Expertise-Search" also adding key words taken from a organizational dictionary specifying his expertise and also adding other relevant data (conditions of work). Someone else in the organization sends a message to people who have Jim's "category" and the same key words and relevant data.

Further Amendments and Modifications

Various other embodiments are contemplated.

For example, the present invention discusses an association between a selection of categories controlled by the recipient, more elaborate associations may be generated. For example, the tag data described herein may include pre-condition attributes that specify tag data that is assumed to exist in a message prior to selection of tag data. These pre-conditions may in turn impact on the choice of actual categories made available to the sender. For example, a recipient can specify that sender A has available to choose Category A, Category B, and Category C for the sending of a message, however, Category B is only available if the message has incorporated within it Category X. More specific pre-conditions may be specified, for example, such that Category B is only available if the message has incorporated within it Category X from sender S1. Such pre-condition would enable the choice of category B only if sender S1 has previously sent a message to Sender A and associated with it tag data associated to Category X.

Other conditions are possible, for example, when associating tag data with a group of contacts, specifying that with each category chosen by a member of the group, a message forwarded to another member of that group would not have access to that category anymore. Other similar conditions may be provided to the control data described herein, in a manner that is known.

It should also be understood, that while selection between categories by a sender is discussed herein, some or all of the selection contemplated may occur on an automatic basis. For example, tag data may already be preselected by a prior sender whose message is now being forwarded or replied to. Tag data may also be automatically retrieved from other programs running on the same or on a different computer system. For example tag data may be retrieved from a program that tracks the work progress of its users. From such a program, tag data related to the current project a user is working on can be retrieved and associated with the message. Similarly, the project related data on which a user is working may be automatically retrieved and added to the message.

Alternatively, tag data may be retrieved from other sources such as equipment that senses the user's physical or conceptual environment. This may include the sensing of the users current geographical location or the user's location within a facility or building, and associating this data with category data in accordance with the present invention. This may also include the retrieving time sensitive data that is then associated with the message. Alternatively, other measurements of the environment or of the user may be performed. This may include the measuring of the speed, temperature or other environmental measures associated with the user's current physical state. This may also include measures of user's data, such as the retrieving of user data from chip cards, the retrieving of health related data such as the users current body temperature, blood pressure, and other body related measurements.

Tag data associated with the dispatcher are then also used to identify automatic processing that should occur on the user's computer or a remote computer associated with the user. For example, the present invention may be used to initiate measurements of the environment and associate its values to the tag data as value attributes.

It should also be understood that while the present invention specifically describes particular user interfaces supporting the operation of the present invention, these are provided for illustration purposes. It is contemplated that the present invention would be provided in co-operation with such other user interfaces as would be available to a person skilled in the art.

Similarly, for illustration purposes a number of categories, or functions identified thereby, are described. In implementing the present invention, use of a numerous other similar categories or functions is also contemplated.

It is further contemplated to implement the present invention across various networks that provide data, image or voice communication. This may involve programming in mobile user interface code, including use of JAVA™ user interface binary classes, in a manner that is well known to those skilled in the art. In relation to the modified browsers and email programs described herein, such modifications would be obvious to a person skilled in the art.

Although in this embodiment category data is sent from the recipient to the sender once a recipient has selected to make available some categories to a recipient, category data can also be sent to an intermediate server, which is then accessed by the sender's messaging program once the recipient is specified during the creation of a message. As is known in the art, the sender's messaging program would then access the intermediate server and to retrieve the categories made available to this sender from the specified recipient, and display the retrieved categories for selection. Alternatively, category data may be selected by the recipient that were made available to the sender by storing same to the recipient's computer system. A sender's messaging program could then access the recipient's computer system to retrieve the categories provided to this sender.

Although in the above described embodiments systems have been described in which email messages are transmitted across networks, it will be appreciated that the present invention is applicable to any type of transmitted data. Thus, for example, the present invention could be applied to transmitted data comprising transactions, commands or any other type of sent or received resources.

Thus, for example, tag data could be transmitted when subscribing to a news group or entering details when registering at a website such that the tag data might be incorporated in later replies and the replies processed according to such tag data. Similarly, tag data could be transmitted to websites when browsing web sites. Data from websites could be, for example, automatically formatted on the basis of a formatting function associated with the tag data.

Although in the above embodiments, categories have been identified by text data, it will be appreciated that any suitable form of data could be used to represent a category for association with a message. Thus for example images, icons or symbols could be used. Alternatively, non-visual signals such as sounds could be used to identify categories for selection and association with messages.

In the above embodiments processing has been described as being performed prior to or subsequent to dispatch. It will be appreciated that where a message is to be processed prior to and subsequent to dispatch in a manner identified by an intended receiver of a message, only data identifying pre-dispatch processes needs to be sent to a dispatcher.

Alternatively, complete copies of data stored on one computer for processing messages from another computer could be generated and stored on the other computer. The processing program, upon receipt of a message, could then determined which of a number of processes identified by the data should be performed.

Although in the first embodiment, filtering of data for generation of records on other computers is described as occurring on the sender's computer, in an alternative embodiment, complete copies of data for generating records could be dispatched and filtering of data might occur only when the data was received.

Although in the above embodiments systems have been described in which processes associated with tags must be selected prior to dispatch of a message, systems could be provided so that if no tag selections are made default processing is performed.

In the above embodiments, processing is described as being performed solely on the basis of the selection of tags associated with a message. In alternative embodiments, processing might be varied dependent upon other data included in a message. Thus, for example, different processes might be associated with a different combination of origin identification addresses and categories or both from and to tags included in a message. Alternatively, in addition to utilizing tag data to select processes keywords within a message or subject header might also be used to select processes, to be performed. Thus, in another embodiment of the invention, different combinations of tag selections, origin addresses and keywords within a message could each be associated with different types of processing.

Alternatively, systems could be provided in which a hierarchical structure of categories is provided and in which users select categories or sub-categories to be associated with messages. When a message is processed, if a sub-category has been previously associated with a message, the message would then be processed in accordance with methods identified by both a main parent category and any additional methods specifically associated with the sub-category. In order to aid users in selecting appropriate categories and sub-categories when sending messages the hierarchical structure of categories could be displayed as part of the user interface.

Although in the above embodiments, each message is provided with data identifying processes to be performed, it will be appreciated that a single message could be divided into a number of parts and the parts of a message each, associated with different data. Thus in this way different parts of the same message could be treated differently.

In the first embodiment, a communications system was described in which whenever contact 20 or handling data 18 associated with another email address was amended, an instruction to make a corresponding update within the memory of the computer identified by the address was also automatically made: Although such a system is applicable to an email messaging system communicating via the Internet where bandwidth for transmitting messages is available, it will be appreciated that some embodiments, for example, an embodiment employing text messages systems via mobile phone, the repeated sending of update instructions would be undesirable. In such an embodiment where bandwidth is limited, update instructions could instead be stored and only dispatched when a message to an identified location is to be sent with a command instruction, for, example, by incorporating the instruction in an extended header, in a manner that is known. Upon receipt of a message, the receiver would then first act upon the command instructions received as part of the message before proceeding to process the received message.

A further alternative would be for requests for updates to be periodically transmitted to computers identified by contact records. Upon receipt of such a request an instruction to make any necessary updates would then be dispatched with the updates required based upon a record of the timings when they were made.

Although in the first embodiment a system was described in which the generation of handling records 18 and contact records 20 are separate from the dispatch of messages, it will be appreciated that a system could be provided in which the entry of unrecognized text data within the name window 151, email window 152, about window 153 or to window 155 of a user interface 150 for dispatching a message automatically causes a further user interface to be displayed to enable the required contact records 40 or handling records 30 to be generated prior to dispatch of a message.

Furthermore, although in the first embodiment a system is described in which the selection of name tags 34 from an about window 153 and a to window 155 are entirely independent, a system could be provided in which the selection of a name tag 34 corresponding to an item in a permitted list 46 automatically causes a selection of one or more name tags from an available list.

Alternatively, a system could be provided in which origin tags 167 and destination tags 169 were automatically added to messages without requiring user selection of name tags 34 to be incorporated in a message. In such a system, origin and destination tags 167, 169 could automatically be added whenever a reply was made to a message where the tags comprised origin and destination tags 167, 169 included in the message being replied to.

Alternatively, messages could automatically include all the tag data 32 and name tags 34 associated with the permitted list 46 and available list 48 of a contact record 40 including an email address 44 corresponding to the email address to which a message is being dispatched.

Although in the first embodiment described messages are processed in any of four different ways. It will be appreciated that other processing of messages could be effected. In particular, the processing identified by one handling record could identify a further handling record as the location in which a message was to be stored, in which case, after the processes identified by the first handling record had been completed, processes associated with a second handling record would be automatically. Alternatively, fewer or different processes could be performed.

In the third embodiment of the present invention, a system has been described in which messages are forwarded or held on a server depending upon status data 318 associated with a user station. In other embodiments, more sophisticated processing dependent upon status data could occur. Thus, for example, whether or not a signal was made to a user to indicate the presence of a message could be selected based upon tag data associated with a message and current status data. Such a system would also be applicable to a system involving the transmission of voice messages such as has been described in the case of the second embodiment. In such a system, the selection of ringing a telephone or recording a voice message, for example, could be made dependent upon both current status data for the receiver of a call and a category selected for a call, where the categories available for a particular caller are selected by the receiver of calls. Furthermore, in some embodiments status data could be used to determine which categories are available for selection. Selection of categories for a call by the sender could be made either from a voice menu as is described in the second embodiment or alternatively from a text menu where such a menu could be displayed on a senders phone.

In the above embodiments tag data is described as being utilized immediately prior or subsequent to dispatch. It will be appreciated that where messages are associated with tag data, the tag data could also be utilized later for example to sort received messages for display when they are read or ordering voice messages for listening.

Although in the above embodiments tag data is described as being transmitted in an unencrypted form, it will be appreciated that encrypting tag data would decrease the possibility tag data could be intercepted and utilized by an unauthorized user. In particular, by encrypting messages, message content and tag data in an extended header could effectively be merged such that it would not be possible for tag data to be extracted and reused with a different message. The use of intercepted tag data would therefore be prevented and unauthorized processing of messages avoided.

Although the embodiments of the invention described with reference to the drawings comprise a computer apparatus and processes performed in a computer apparatus, the invention also extends to computer programs, particularly computer programs on or in a carrier, adapted for putting the invention into practice. The program may be in the form of source or object code or in any other form suitable for use in the implementation of the processes according to the invention. The carrier be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means.

When a program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

Although in the above embodiments the processing of category data was described as occurring prior and subsequent to the dispatch of messages, category data can also be processed at the following instances: during the setup of categories such as when a new category is created by a recipient. Such processing could include, transmitting the newly created category to a central server for storage and future retrieval in a centralized category dictionary database;

a recipient allocating a category to one or more contacts, for example, for checking whether that particular contact is using more than one type of messaging device or service; and informing the user at his/her contact device such that allocation of categories can be done to more than one device; upon a sender receiving categories made available by a remote user, such as invoking a confirmation to accept/reject categories made available by remote user; upon a sender accepting categories made available by a remote user; during the initiation of a communication when:

upon a sender entering a new ID (e.g. email address) of a recipient of communication (such as the performing of a process for requesting if/when recipient of this new communication is in the same context as the sender context; upon the sender (User2) associating to the message one or more categories made available by the recipient. (A special from might appear for that particular message such as "Make-a-Call-Email".) In addition, the processing may occur upon the sender (User2) dispatching a message with the associated categories (Message might be automatically encrypted to be automatically decrypted upon reception). Or, upon the recipient (User1) receiving a message associated with one or more of his/her categories (A range of automatic process might be evoked—see below section: "With following advantages". Or, upon a sender (User) initiating a communication and pre-allocates a category for the reply. Or, upon the sender (User1) pre-associating a category to a message with the intention that replies to that message should automatically be associated to that same category upon return (By allocating a category to a message a text-form appears). Or upon the sender (User1) dispatching the message (a copy of the message is sent to a main server which corresponds to the categorization of the sender). Or upon the recipient (User2) receiving a message with the sender's pre-allocated category and a process is evoked, e.g. a notification on the senders mobile phone that the message has arrived). Or, upon the recipient (User2) replying to the message and dispatching the message, which evokes a process. Or upon the sender (User1) receiving replies which are processed according to functions preset for the associated category. (A range of automatic process might be evoked—see below section: "With following advantages")

It will be appreciated that senders can be asked permission to accept processing criteria from receivers It will be appreciated that new processing criteria can be continuously added, deleted, or changed by a recipient or a $3^{rd}$ party, such as an administrator, on behalf of the recipient. It will also be appreciated that a sender can make suggestions to a receiver—by, for example, means of a message—to add processing criteria not yet known to the receiver, which the receiver can confirm to accept or reject.

In addition, it can also be appreciated that processing criteria that needs to be changed could be in form of joining two processing criteria to merge into one in which case either all processes associated with both processing criteria would be performed, or only processes associated with one of the processing criteria, or a new set of processes is associated to the joint processing criteria, or any other variation of joining some processing with either one of the processing criteria.

In addition, it can also be appreciated that a single processing criterion can be partitioned into two or more separate processing criteria enabling new processes to be performed to messages received which are associated with either of the new processing criteria, or all of the processing criteria, the previously existing one and the new ones that were created.

In case of changes to processing criteria, such changes are then made known to the potential senders through the updating processes disclosed in this invention.

Alternatively, processing rules may be associated with the processing criteria and its processing criteria parts. For example, a part-subpart relationship rule can be established between the processing criteria and its parts, which may be transmitted to potential senders. Alternatively, a part-child relationship rule, together with inheritance rules, as known in the art, may be associated with the criterion and its parts, where processes and control data of the parent processing criteria are "inherited", to its parts, including the children processing criteria. For example, a message categorized with a child processing criterion would then be processed in accordance to the processes of the child processing criteria and possibly in accordance with the parent processes.

It will also be appreciated that messages received prior to the splitting of a processing criteria into parts, could be sent back to their senders together with a directive to further categorize the messages in accordance to the new processing criteria introduced by the splitting of the processing criteria into parts.

It will be appreciated that a recipient can make some processing criteria publicly available to senders such as on a third party server. This can be done in addition to processing criteria made available to specific senders only. Publicly available processing criteria may be retrieved by any anonymous sender possibly not known to the recipient, and be used to categorize messages dispatched to the recipient. Control data associated processing criteria would then indicate when said processing criteria were made available publicly to anonymous possible senders.

Additionally, recipient may be notified when an anonymous sender retrieves such public processing criteria. This may occur by registering the user who retrieves the public processing criteria through techniques known in the arts.

Alternatively, the potential sender may directly retrieve the public processing criteria from the recipients messaging application.

It will also be appreciated that a single message can contain different parts to be associated to different recipients and reaching different recipients with a single dispatching activity. In such a case, part of a message may be sent to the different recipients together with their respectively associated processing criteria. Alternatively, the message as a whole can be sent to all recipients, while the respective recipients' messaging applications process only those processing criteria associated with each recipient. Such processing can occur on only those parts of the entire message or on the entire message.

It will also be appreciated that when copies of messages are sent to other recipients, the sender can choose different or the same processing criteria for each recipient of the message. A message to a group of recipients, where the group is identified by a single group name that is associated to a list of recipients, can have different processing criteria associated to each recipient included in the list, or may use common processing criteria that are associated with the group. In such a case, each recipient associated with this group, may need to define the common processing criteria, and include those processing criteria in the selection made available to the sender.

Alternatively, when sending a message associated with a processing criterion to a recipient, whose messaging program does not have such a defined processing criteria, or when the recipient does not have such a processing criteria selected to be used for the sender, then the recipient may be asked by the messaging application whether to include the associated processing criteria in the list of processing criteria defined for the recipient and whether to include the processing criteria in the selection of processing criteria made available for the said sender. In addition the sender may include attached to the processing criteria an identifier to a process that can be associated to the processing criteria that may now newly be defined. Alternatively, the recipient may associate processes to the newly created processing criteria.

It will be appreciated that addressing such group messages can be set up through means of group message facilities as known in the arts. Messages can then be addressed with a single selection action associated with the selection of a group as a destination address of a message.

It will also be appreciated that a message that includes attached parts, known in the art as attachments, may have additional or different processing criteria associated with the message and its attachment. Upon receiving such a message that includes attached parts, where the message and the attachment have associated processing criteria, the corresponding processes are performed on the message and on the attachment. For example, an email message will be processed in one way and attachments to an email message, such as, but not limited to documents or videos or music will be processed in another way.

It will be appreciated that in a system where processing is performed on received messages in accordance with processes identified by the tags that are associated with a message, and in accordance with other recipient defined processing criteria that were not included in the selection of processing criteria that were previously made available to senders, and which may depend on the current state of affairs or context of the recipient when the message is received, that such predefined criteria may be made available to selected senders. For example, when a recipient has defined a processing criteria associated with the current work context he/she is currently involved in, such processing criteria may be made available to selected senders to inform them what the current work context of the recipient currently is. Such processing criteria when updated by the recipient, such as when the recipient changes his current work context, may then be updated for all selected senders. A sender, who has received a processing criterion denoting the current context of a recipient, can for example, use this knowledge in choosing other processing criteria in order to more effectively communicate with the recipient. Alternatively, a sender can make his processing criteria dependent on the work context the recipient is in.

It will be appreciated that processing criteria may be parameterized in accordance with some variables, which can be associated to values residing on the recipients software system, or to values residing on other software systems on behalf the recipient or the sender. When such values change, all processing criteria, which are parameterized and linked to those values will be updated accordingly. For example, user interface information data that specifies the layout of a user interface for composing a message that is classified with the said processing criteria may be linked to data on the recipient's computer, or some other $3^{rd}$ party machine, such as the manufacturer of the senders messaging equipment. When the recipient or the manufacturer updates the data specifying the user interface such data is then also sent to senders of the selected processing criteria whose parameters are linked to the said user interface data. In addition configuration data, stored on the senders messaging equipment may be used to further customize the appearance of the user interface associated with the processing criteria. Such data on the sender's machine would be associated with a parameter associated with the processing criteria the sender has received from the recipients.

Alternatively, processing criteria may be parameterized in relation to help texts that are displayed to users upon request. The recipient for such selected users may then automatically update the displayed help texts.

What is claimed is:

1. A server for controlling processing of data communicated between a first computer and a second computer among a plurality of computers connected to a communication network, the server comprising:
  generation means for generating a group of processing criteria for recipient controlled communication with the first computer;
  means for selecting a first subset of processing criteria from the group of processing criteria, wherein the means for selecting the first subset of processing criteria is adapted to identify which processing criteria are to be available to the second computer;
  means for associating contact data with the first computer, the contact data comprising a plurality of contact records, each contact record comprising an address of one of the plurality of computers and a set of processing criteria that are associated with the one of the plurality of computers, the associating means comprising means for storing and accessing the contact data, wherein one contact record of the plurality of contact records corresponds to the second computer;
  means for utilizing the one contact record to associate the first subset of processing criteria with the second computer;
  means for selecting a second subset of processing criteria from the first subset of processing criteria for a communication from the second computer to the first computer, wherein the means for selecting the second subset of processing criteria is adapted to identify which processing criteria are to apply to the communication;
  means for associating the communication with the second subset of processing criteria; and
  means for processing the communication in accordance with the second subset of processing criteria.

2. A server configured to communicate with a plurality of user terminals over a network, and to receive a plurality of messages dispatched by the user terminals, the server comprising:
  storage means for storing:
    category data for identifying a plurality of categories that are associable with the messages;
    a respective plurality of lists of subsets of the user terminals that are associated with the categories; and
    a plurality of subroutines, each of which is associated with one of the categories and is for defining how a message among the messages and associated with the one of the categories is to be processed,
  wherein a sending terminal of the user terminals for dispatching the message to the server is a member of a corresponding one of the lists of the subsets of the user terminals associated with the one of the categories,
  wherein the subroutines comprise a subroutine for storing the message in a specific location or a subroutine for forwarding the message to a selected group of the user terminals,
  wherein the server is further configured to provide a receiving terminal of the user terminals with a capability to add or remove the receiving terminal from the selected group of the user terminals,
  wherein the storage means is configured to store a user status of the receiving terminal, and
  wherein the server is further configured to process the message with the subroutine for storing the message in the specific location or with the subroutine for forwarding the message to the selected group of the user terminals, depending on the user status of the receiving terminal.

3. A network comprising the server of claim 2 and the plurality of user terminals coupled to the server, wherein the user terminals are configured to generate and dispatch the messages to the server.

* * * * *